(12) United States Patent
Pan

(10) Patent No.: US 11,273,601 B2
(45) Date of Patent: Mar. 15, 2022

(54) SYSTEM AND METHOD FOR ROTATIONAL 3D PRINTING

(71) Applicant: Nick Pan, Erwinna, PA (US)

(72) Inventor: Nick Pan, Erwinna, PA (US)

(73) Assignee: PANAM 3D LLC, Erwinna, PA (US)

( * ) Notice: Subject to any disclaimer, the term of this patent is extended or adjusted under 35 U.S.C. 154(b) by 731 days.

(21) Appl. No.: 16/181,421

(22) Filed: Nov. 6, 2018

(65) Prior Publication Data

US 2020/0139626 A1    May 7, 2020

Related U.S. Application Data

(63) Continuation-in-part of application No. 15/954,062, filed on Apr. 16, 2018.

(51) Int. Cl.
| | |
|---|---|
| *B29C 64/218* | (2017.01) |
| *B28B 1/00* | (2006.01) |
| *B33Y 30/00* | (2015.01) |
| *B29C 64/153* | (2017.01) |

(Continued)

(52) U.S. Cl.
CPC ............ *B29C 64/218* (2017.08); *B22F 12/00* (2021.01); *B28B 1/001* (2013.01); *B29C 64/153* (2017.08); *B33Y 30/00* (2014.12); *B22F 10/10* (2021.01)

(58) Field of Classification Search
None
See application file for complete search history.

(56) References Cited

U.S. PATENT DOCUMENTS

| | | |
|---|---|---|
| 5,304,329 A | 4/1994 | Dickens et al. |
| 5,733,497 A | 3/1998 | Mcalea et al. |
| 7,828,022 B2 | 11/2010 | Davidson et al. |

(Continued)

FOREIGN PATENT DOCUMENTS

| | | |
|---|---|---|
| DE | 102014004633 | 10/2015 |
| WO | WO2014092651 | 6/2014 |

(Continued)

OTHER PUBLICATIONS

PCT International Search Report and Written Opinion dated Jul. 5, 2019 from corresponding PCT Appln. No. PCT/US19/27635.

(Continued)

*Primary Examiner* — Matthew J Daniels
*Assistant Examiner* — Paul Spiel
(74) *Attorney, Agent, or Firm* — Massina Pat & TM Law PLLC

(57) ABSTRACT

An apparatus for fabricating a three-dimensional object from a representation of the object stored in memory. The apparatus includes an outer drum supported for rotation and an inner drum positioned within the outer drum and supported for rotation therewith. A powder receiving chamber is defined between the outer drum and the inner drum. A build platform is supported for linear movement within the powder receiving chamber from a first position adjacent a first end of the drums to a second position within the powder receiving chamber. The build platform is rotationally fixed relative to at least one of the inner or outer drums such that the build platform rotates with the drums. At least one directed energy source is positioned above the build platform and is configured to apply directed energy to at least a portion of the powder receiving chamber.

18 Claims, 19 Drawing Sheets

(51) Int. Cl.
  *B22F 12/00* (2021.01)
  *B22F 10/10* (2021.01)

(56) References Cited

U.S. PATENT DOCUMENTS

| | | |
|---|---|---|
| 8,827,684 B1 | 9/2014 | Schumacher et al. |
| 8,905,742 B2 | 12/2014 | Knighton |
| 9,586,290 B2 | 3/2017 | Buller et al. |
| 9,688,026 B2 | 6/2017 | Ho et al. |
| 2003/0205851 A1 | 11/2003 | Laschuetzka et al. |
| 2004/0265413 A1 | 12/2004 | Russel et al. |
| 2006/0108712 A1 | 5/2006 | Mattes |
| 2014/0191439 A1 | 7/2014 | Davis |
| 2016/0031159 A1 | 2/2016 | Church et al. |
| 2016/0136759 A1* | 5/2016 | Broda ............... B22F 3/24 219/76.1 |
| 2016/0167303 A1 | 6/2016 | Hellestam |
| 2016/0200052 A1 | 7/2016 | Moore et al. |
| 2017/0008082 A1 | 1/2017 | Chen |
| 2017/0120334 A1 | 5/2017 | Demuth et al. |
| 2017/0190112 A1 | 7/2017 | Thorson et al. |
| 2017/0246803 A1* | 8/2017 | Johnson ............... B29C 64/135 |
| 2017/0348905 A1 | 12/2017 | Fey |
| 2018/0345369 A1* | 12/2018 | Corsmeier ............. B22F 12/00 |
| 2019/0240903 A1* | 8/2019 | Isobe ................... B29C 64/232 |
| 2019/0344346 A1* | 11/2019 | Tucker ................. B22F 10/20 |
| 2021/0154929 A1* | 5/2021 | Long .................... B29C 64/209 |

FOREIGN PATENT DOCUMENTS

| | | | |
|---|---|---|---|
| WO | WO-2014092651 A * | 6/2014 | ......... B29C 64/241 |
| WO | WO2014195068 | 12/2014 | |
| WO | WO2017114852 | 7/2017 | |

OTHER PUBLICATIONS

A True Rotary 3D printer? https://www.element14.com/community/thread/25031/1/a-true-rotary-3d-printer?displayFullThread=true.

* cited by examiner

SYSTEM AND METHOD FOR ROTATIONAL 3D PRINTING

This application is a continuation-in-part of U.S. application Ser. No. 15/954,062, filed on Apr. 16, 2018, the contents of which are incorporated herein by reference.

FIELD

The disclosure herein relates to systems and methods for 3D printing, in particular for continuous rotary 3D printing.

BACKGROUND

Three-dimensional (3D) printed parts result in a physical object being fabricated from a 3D digital image by laying down consecutive thin layers of material.

Typically these 3D printed parts can be made by a variety of means, such as selective laser sintering, selective laser melting or selective electron beam melting, which operate by having a powder bed onto which an energy beam of light or heat is projected to melt the top layer of the powder bed so that it welds onto a substrate or a substratum. This melting process is repeated to add additional layers to the substratum to incrementally build up the part until completely fabricated.

For each additional layer, powder is deposited onto the powder bed and then must be smoothed prior to application of energy for the melting/sintering of the next layer. In this regard, the powder beds typically have a rectangular configuration and require the powder applicator and a smoothing roller or the like to be linearly moved across the bed, often requiring a forward and reverse path to accomplish both depositing and smoothing. While some systems have accomplished depositing and smoothing in a single pass, such systems generally require a larger footprint to accomplish such. Whether in a single pass or a reciprocal pass, application of the energy, and thereby formation of the next layer, must be paused during such depositing and smoothing steps.

Since many 3D printed parts are comprised of thousands of layers, such delays between formation of each layer result in a time consuming process which has limited the full scale application of 3D printing.

SUMMARY

In at least one embodiment, the present disclosure provides an apparatus for fabricating a three-dimensional object from a representation of the object stored in memory. The apparatus includes a drum supported for rotation. A build platform is supported for linear movement within the drum from a first position adjacent a first end of the drum to a second position within the drum. The build platform is rotationally fixed relative to the drum such that the build platform rotates with the drum. A powder feed hopper is fixed at a position above a first portion of the build platform. At least one directed energy source is positioned above the build platform and is configured to apply directed energy to a majority of the remaining portion of the build platform excluding the first portion.

In at least one embodiment, the present disclosure provides an apparatus for fabricating a three-dimensional object from a representation of the object stored in memory. The apparatus includes an outer drum supported for rotation and an inner drum positioned within the outer drum and supported for rotation therewith. A powder receiving chamber is defined between the outer drum and the inner drum. A build platform is supported for linear movement within the powder receiving chamber from a first position adjacent a first end of the drums to a second position within the powder receiving chamber. The build platform is rotationally fixed relative to at least one of the inner or outer drums such that the build platform rotates with the drums. A powder feed hopper is positioned above the build platform. At least one directed energy source is positioned above the build platform and is configured to apply directed energy to at least a portion of the powder receiving chamber.

BRIEF DESCRIPTION OF THE DRAWINGS

The accompanying drawings, which are incorporated herein and constitute part of this specification, illustrate the presently preferred embodiments of the disclosure, and, together with the general description given above and the detailed description given below, serve to explain the features of the disclosure. In the drawings.

DETAILED DESCRIPTION

Figure 1:
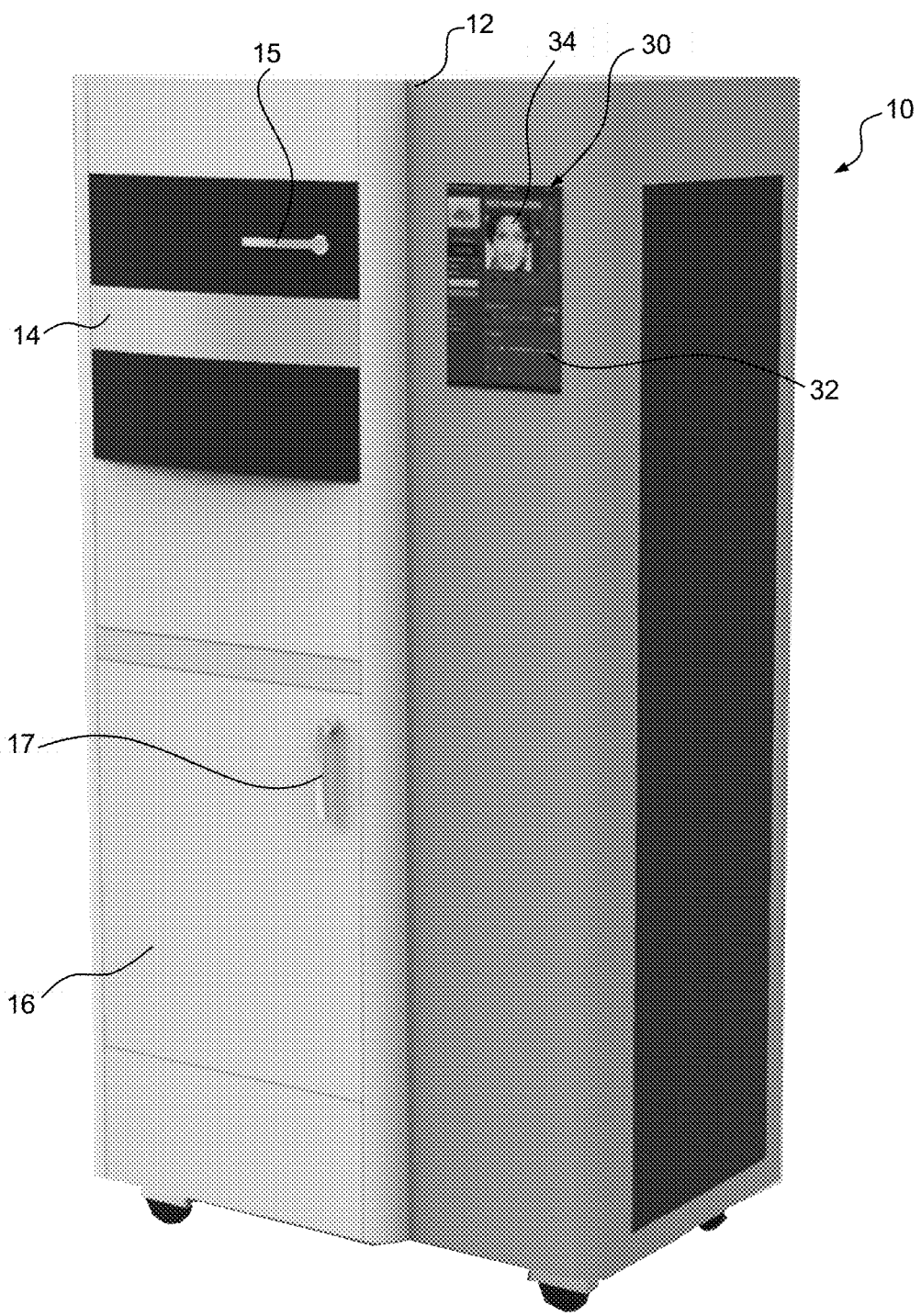
FIG. 1 is a perspective view of a 3D printing system in accordance with an embodiment of the disclosure.

In the drawings, like numerals indicate like elements throughout. Certain terminology is used herein for convenience only and is not to be taken as a limitation on the present disclosure. The following describes preferred embodiments of the present disclosure. However, it should be understood, based on this disclosure, that the disclosure is not limited by the preferred embodiments described herein.

Referring to FIGS. 1-4, a 3D printing system 10 in accordance with an embodiment of the disclosure will be described generally. In the illustrated embodiment, the printing system 10 includes a housing 12 which encloses a drum assembly 50 and a build assembly 80 and may optionally enclose gas supply tanks 40 and powder supply containers 46. It is understood that the gas supply and/or powder supply may be external to the housing 12 and may be fed into the housing 12 via pipes, tubes or the like. The housing 12 is formed from various exterior panels secured to a support frame 20. Various doors, removable panels or the like may be provided to facilitate access to different areas within the housing 12. As illustrated in FIG. 1, a first door 14 provides access to the build assembly 80 while a second door 16 provides access to the drum assembly 50, the doors 14, 16 having respective handles 15, 17. While two doors are shown, it is understood that more or fewer doors may be utilized.

It is noted that due to the rotary motion of the drum assembly 50 and the build platform 70 while the build assembly 80 remains stationary, generally within the radius of the drum 54, the housing 12 has a relatively small footprint. More specifically, because it is not necessary to move the powder applicator and/or smoothing roller clear of the build platform, such additional space within the housing which is usually required for X-Y printing systems is not required.

Referring to FIG. 1, a control panel 30 is supported on the housing 12 and is in communication with a control processor (not shown) within the housing 12. The control panel 30 includes an input/output (I/O) interface 32, for example, in the form of a touch screen, however other I/O devices may be utilized. A user can utilized the I/O interface 32 to enter control commands, data and the like to the control processor and receive information indicative of the operation of the system 10. In the illustrated embodiment, the control panel 30 includes a face recognition sensor 34, for example as described in US Appln. Pub. No. 2017/0228585, the contents of which are incorporated herein by reference. The face recognition sensor 34 is configured to regulate access to the control processor or physical access within the housing 12. The face recognition system 34 may also be utilized to maintain a log of users accessing the system 10 and each individual's usage. While a face recognition system is described, the system 10 may incorporate additional or alternative access control, for example, other biometric sensors, control card sensors or password sensors. Alternatively, if utilized in a secure environment, the system 10 may not have any access control.

Figure 2:
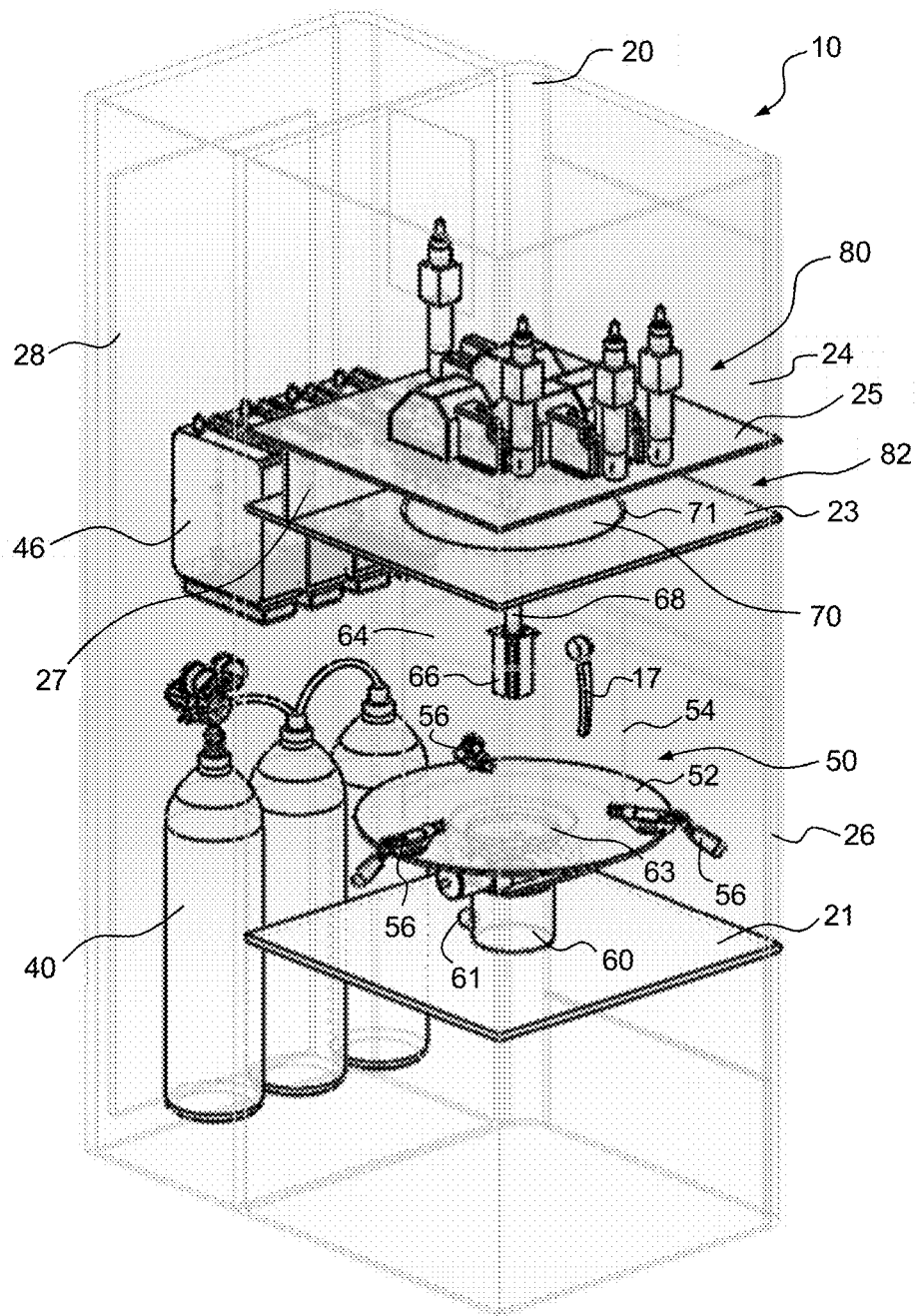
FIG. 2 is a perspective view of the 3D printing system with the housing panels removed and the frame structure shown in phantom.
Figure 3:
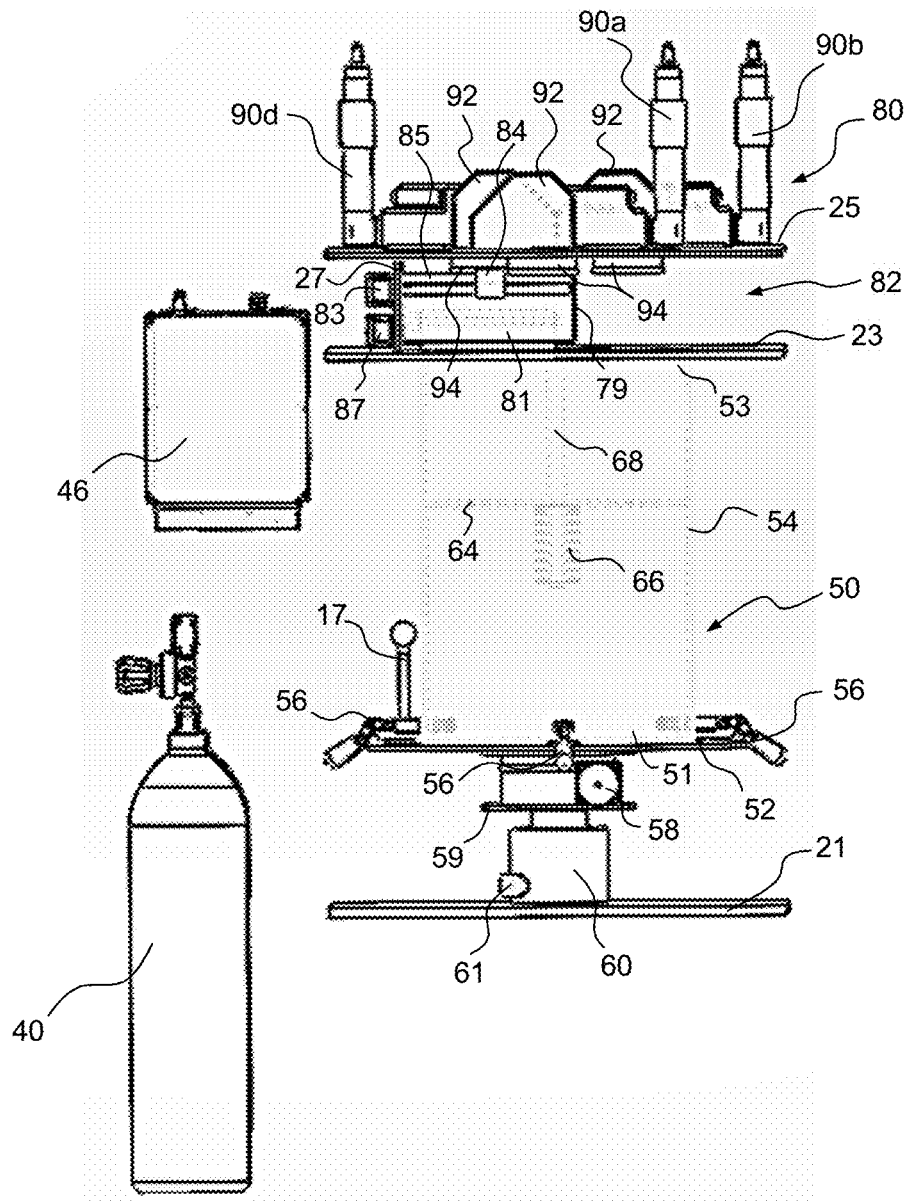
FIG. 3 is a left side elevation view of the 3D printing system with the housing and frame structure removed.
Figure 4:
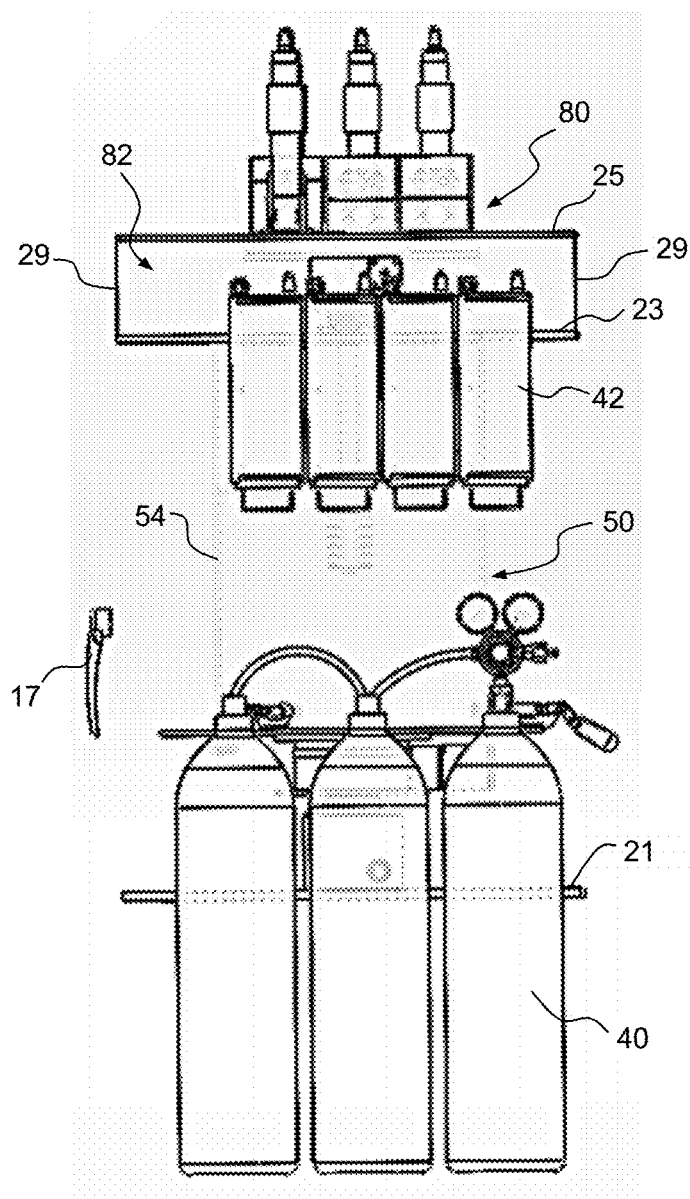
FIG. 4 is a rear elevation view of the 3D printing system with the housing and frame structure removed.
Figure 5:
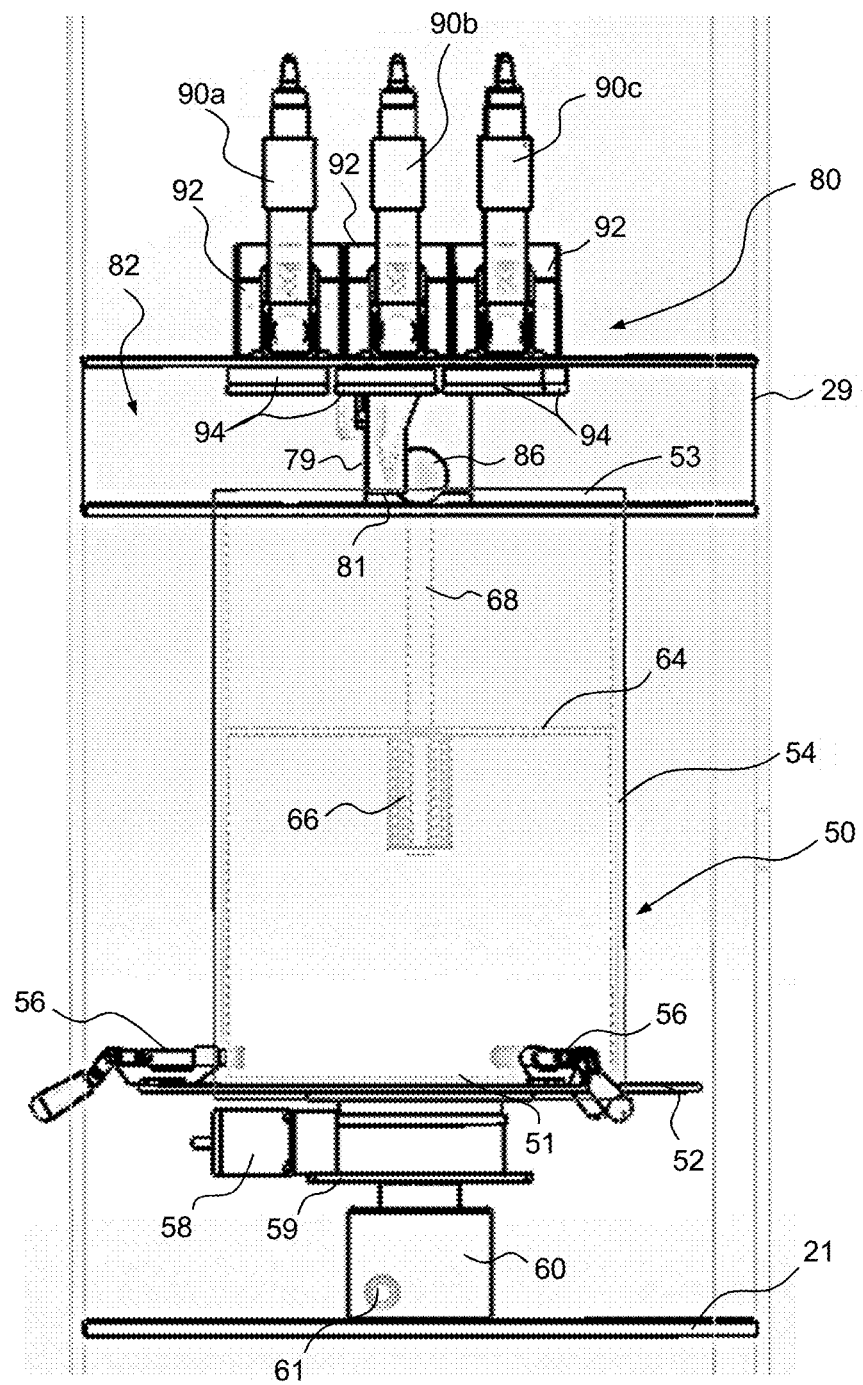
FIG. 5 is a front elevation view of a portion of the 3D printing system with the housing panels removed and the frame structure shown in phantom.
Figure 6:
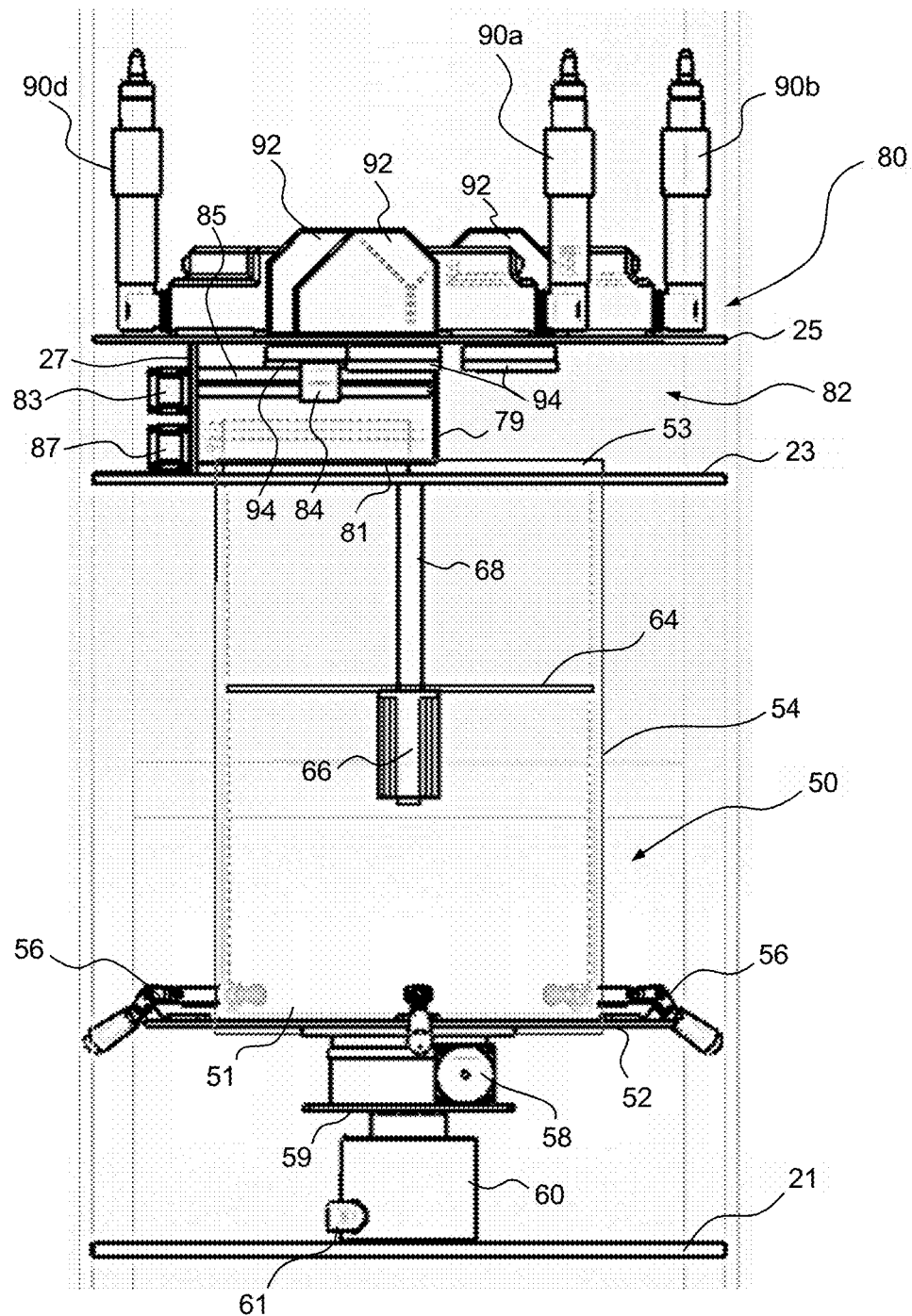
FIG. 6 is a left side elevation view of a portion of the 3D printing system with the housing removed and the frame structure shown in phantom.
Figure 7:
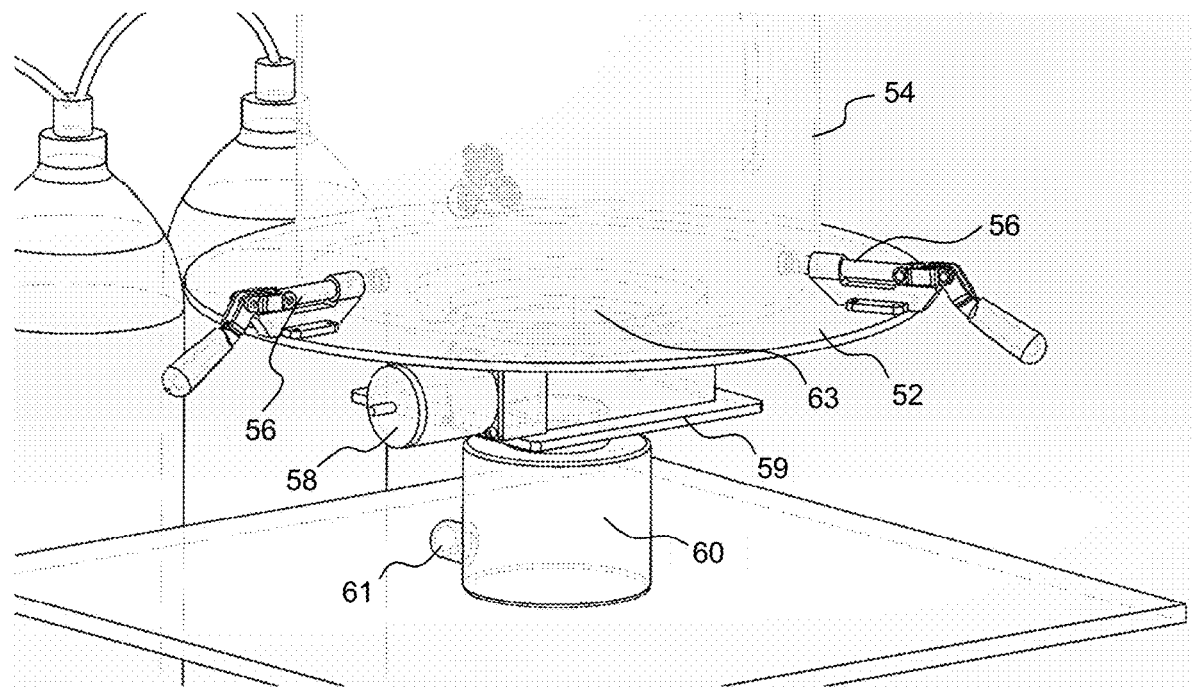
FIG. 7 is a top perspective view of the drum rotation assembly.
Figure 8:
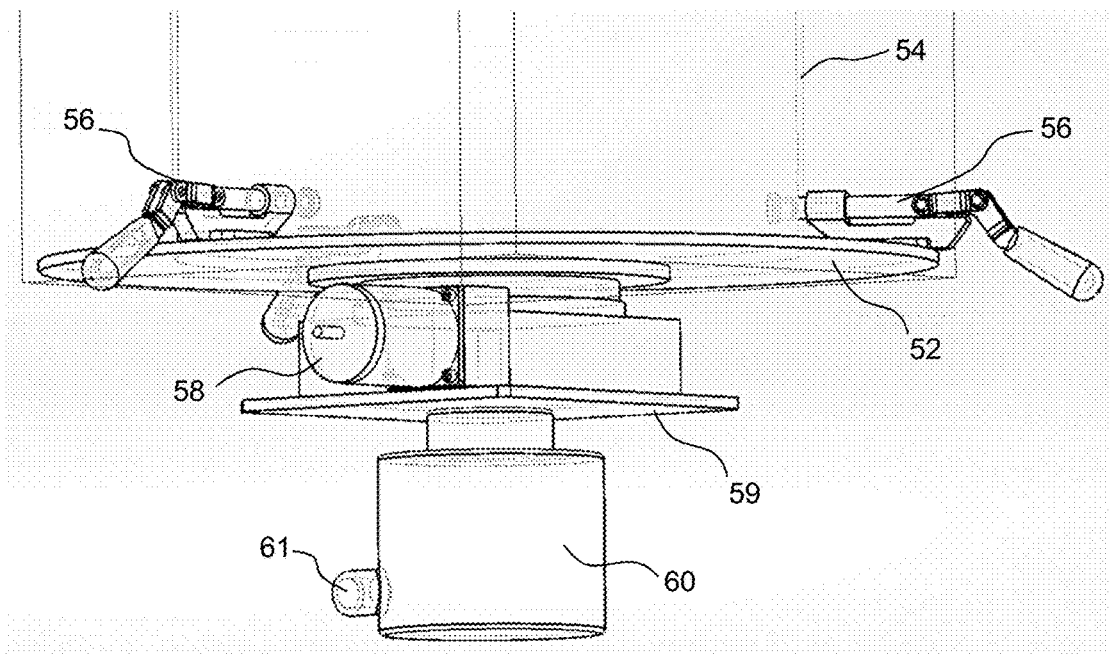
FIG. 8 is a bottom perspective view of the drum rotation assembly.

Referring to FIGS. 2-4, within the housing 12, a lower support panel 21, an intermediate panel 23 and an upper support panel 25 are supported by the frame 20. The lower support panel 21 is configured to support the drum assembly 50. The upper support panel 25 is configured to support portions of the build assembly 80. The intermediate panel 23 is positioned between the lower and upper panels 21, 25 with a build chamber 82 defined therebetween the intermediate panel 23 and the upper support panel 25. A vertical support panel 27 extends between the panels 23, 25 to support portions of the build assembly 80 within the build chamber 82. A sealing wall 29, which is illustrated in FIG. 4 but is omitted in FIGS. 2 and 3, extends between the panels 23, 25 on the remaining three sides and in sealing engagement with the panels 23, 25, 27 such that the build chamber 82 is air-tight. The sealing wall 29, or a portion thereof, may be removable to facilitate access within the build chamber 82 if necessary.

Turning to FIGS. 5-12, the drum assembly 50 and the build assembly 80 will be described in more detail. The drum assembly 50 generally includes a generally cylindrical drum 54 with a through passage extending from a lower end 51 to an upper end 53. The lower end 51 of drum 54 is supported on a rotatable platform 52 in sealing engagement therewith. Clamps 56 or the like are utilized to releasably secure the drum 54 to the platform 52. The upper end 53 of the drum 54 extends to the build chamber 82 through an opening 71 in the intermediate panel 23 (see FIG. 2). The upper end 53 is in sealing engagement with the intermediate panel 23 while still being rotatable relative thereto.

A drum motor 58 is supported below the rotatable platform 52 in a fixed position relative to the lower support platform 21. The drum motor 58 is configured to rotate the rotatable platform 52 and thereby the drum 54. Bearings or the like (not shown), may be provided about the rotatable platform 52 and/or the drum 54 to facilitate smooth rotation thereof. The drum motor 58 is in communication with the control processor which controls the drum motor 58 to rotate the rotatable platform 52, and thereby the drum 54 at a desired speed.

In the illustrated embodiment, the drum motor 58 is supported on a fixed plate 59 which is fixed relative to the lower support panel 21. In the illustrated embodiment, a vacuum unit 60 is positioned between the fixed plate 59 and the lower support panel 21. The vacuum 60 has an outlet port 61 which may be vented outside of the housing 12. The vacuum 60 has an intake 63 which extends through the rotatable platform 52 such that the vacuum force may be applied into the drum 54 and into the build chamber 82 to remove heat and smoke generated during the printing process.

A support structure 64 is supported within the drum 54 and is configured to rigidly support a screw drive 66 relative to the drum 54. The support structure 64 may have various configurations, for example, a plate, a spoke, cross straps, a cantilevered arm, or the like which fixedly supports the screw drive 66 relative to the drum 54. Preferably the support structure 64 has some porosity to allow the vacuum force to pass thereby. A screw shaft 68 extends from the screw drive 66 to the build platform 70 (see FIG. 9). The screw shaft 68 is fixed against rotation relative to the both the screw drive 66 and the build platform 70. Since the screw drive 66 is fixed relative to the drum 54, rotation of the drum 54 by the drum motor 58 will cause a corresponding rotation of the build platform 70, as indicated by the arrows A in FIGS. 9 and 10.

Figure 9:
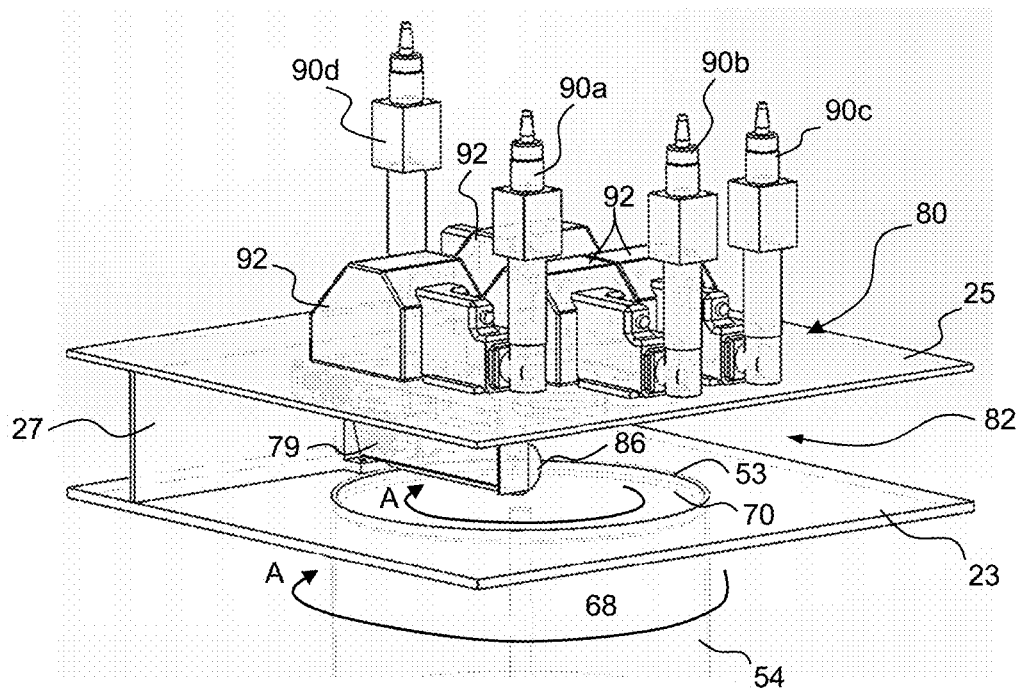
FIG. 9 is a top perspective view of the build assembly.
Figure 10:
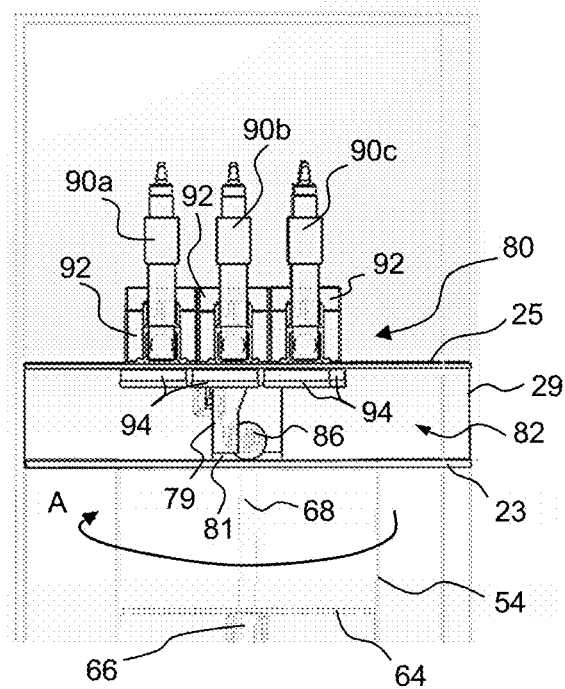
FIG. 10 is a front elevation view of the build assembly.

The build platform 70 starts in an initial position just at or slightly above the upper end 53 of the drum 54 as shown in FIG. 9. The inner diameter of the drum 54 and the outer diameter of the build platform 70 are maintained to close tolerances such that only a minimal gap 72 extends therebetween (see FIG. 12). To facilitate the vacuum force reaching the build chamber 82, the build platform 70 is preferably manufactured from a gas permeable material, for example, a gas permeable ceramic such as an ultra filtration ceramic membrane, which allows the heat and smoke to be vacuumed from the build chamber 82 but does not allow the powder to pass through.

Since the build assembly 80 is fixed in location, as each successive layer of the 3D printed objects is sintered or melted, it is necessary to move the build platform down by such layer thickness. Such downward movement is accomplished by the screw drive 66. As the internal screw of the screw drive is rotated, as indicated by arrow B in FIG. 12, the internal screw engages the screw shaft 68, causing the shaft 68 to move linearly as indicated by arrow C. The screw drive 66 does not rotate the screw shaft, but instead, the engagement of the respective threads and the rotationally fixed configuration of the screw shaft 68, causes the shaft to move linearly. Rotation of the screw drive 66 is independent of rotation of the drum motor 58 which allows precise lowering in response to layer thickness regardless of the rotation speed of the drum 54 and thereby the build platform 70. With this configuration, the completed object(s) will be lowered into the drum 54. Upon completion, the drum 54 may be released via the clamps 56 or the like and the drum 54 removed from the housing to remove the completed object(s). A new, empty drum may be clamped on to the rotating platform 52 and a new process started. Alternatively, it is contemplated that a system may hold more than one drum and the drums may be selectively rotated into position in alignment with the build assembly 80. It is further contemplated that post printing machinery, for example, a pressure cleaning system, a CNC machine or the like may be housed within the housing to finish the completed objects once they are removed from the drum.

The build assembly 80 includes a hopper 79 with a lower opening 81 configured to continuously deliver powder to the build platform 70. The hopper 79 is supported by the vertical support panel 27. In the illustrated embodiment, a slide mechanism 84 is supported along a rail 85 on the side of the hopper 79. The slide mechanism 84 connects to an end of a delivery hose (not shown) extending from the powder containers 46. A linear actuator 83 associated with the slide mechanism 84 moves the slide mechanism 84 back and forth along the rail 85 such that the delivery hose end moves back and forth along the hopper 79, evenly distributing the powder. The powder may be any form of small particles typically used in laser or electron beam 3D printing. For example, the powder may be of plastic, metal, ceramic, glass or composites thereof. As non-limiting examples, the powder may include polymers such as nylon (neat, glass-filled, or with other fillers) or polystyrene, or metals including steel, titanium, alloy mixtures, for example, but not limited to, 17-4 and 15-5 stainless steel, maraging steel, cobalt chromium, inconel 625 and 718, aluminum AlSi10Mg, and titanium Ti6Al4V.

After the powder is delivered to the rotating build platform 70, it is smoothed by a roller 86 on the trailing side of the hopper 79. The roller 86 is supported by the vertical support panel 27 and is rotated by an actuator 87. The roller 86 is rotated such that its lower edge moves toward the hopper 79, i.e. toward the oncoming powder, thereby smoothing the powder. The smoothed powder is then ready for selective fusing via melting or sintering utilizing a targeted energy source.

Figure 11:
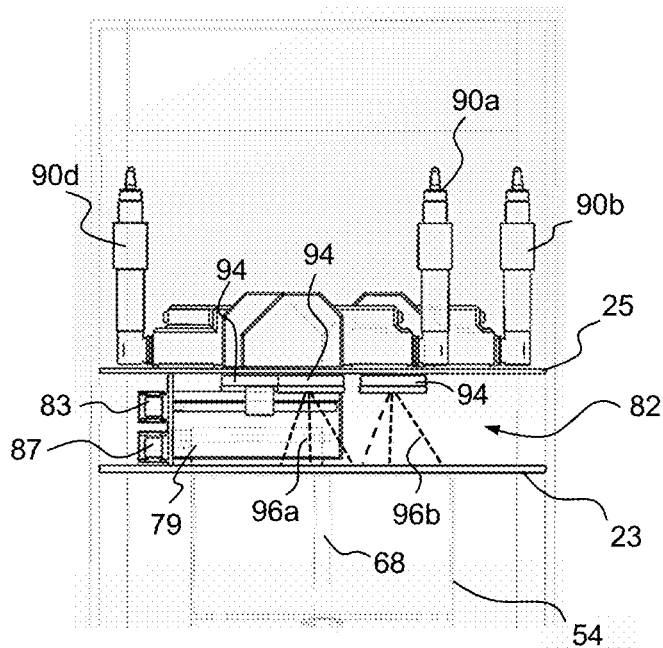
FIG. 11 is a left side elevation view of the build assembly.
Figure 12:
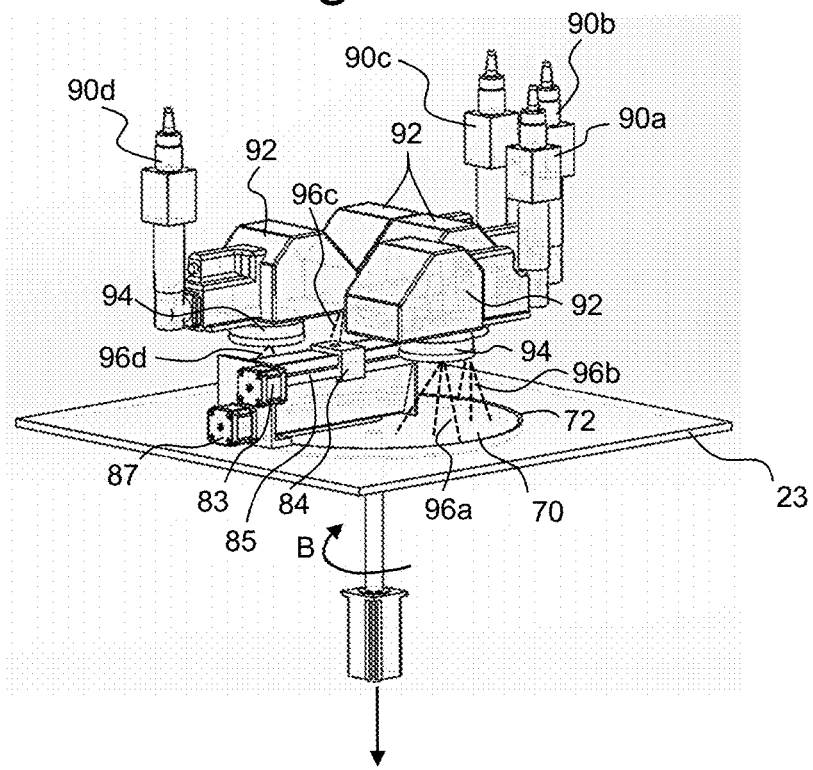
FIG. 12 is a top perspective view of the build assembly and vertical control assembly.

In the illustrated embodiment, the targeted energy source is a plurality of lasers 90a-90d. Each laser 90a-90d has an associated beam deflection system 92, e.g. Galvano scanner, which is used to focus the laser beam 96a-96d out the respective beam window 94 to the desired position on the build platform 70 in order to scan each layer, as illustrated in FIGS. 11-12. The lasers 90a-90d may have various configurations, for example, Nd:YAG and Yb-fiber optic lasers, CO lasers and He—Cd lasers. Because the hopper 79 and roller 86 provide continuously smooth powder and the target areas of the beams 96a-96d are the remainder of the build platform 70 other than the fixed position hopper 79 and roller 86, the layers may be formed continuously along the rotating build platform 70 without any need to pause the fusing process. As such, the multiple lasers may print consecutive portions of the desired product, thereby stitching the product together as it travels along the complete rotational path of the build platform 70. The number and position of the lasers 90a-90d may be selected to provide desired fusing at a desired rotation speed of the build platform 70. It is also noted that the beam windows 94 are relatively close to the build platform 70, the beams 96a-96d will have less distance to travel to accomplish fusing of a given layer, affording greater rotation speeds. Additionally, the beams 96a-96d contact the powder at less of an inclination resulting in less angled formation and accompanying roughness.

Such laser sintering or melting typically requires a tightly controlled atmosphere of inert gas, for example, argon or nitrogen at oxygen levels below 500 parts per million. The sealed build chamber 82 allows for such a controlled atmosphere with the required gas controllably supplied by the gas tanks 40.

While the illustrated embodiment utilizes lasers, other energy sources may be utilized, for example, electron beam guns. In such a system, since electrons interact with the atmosphere, it is necessary to have a vacuum chamber which may be maintained in the sealed build chamber using a controlled helium inflow from the gas tanks 40. In all other aspects, the system would operate in the same manner.

Figure 13:
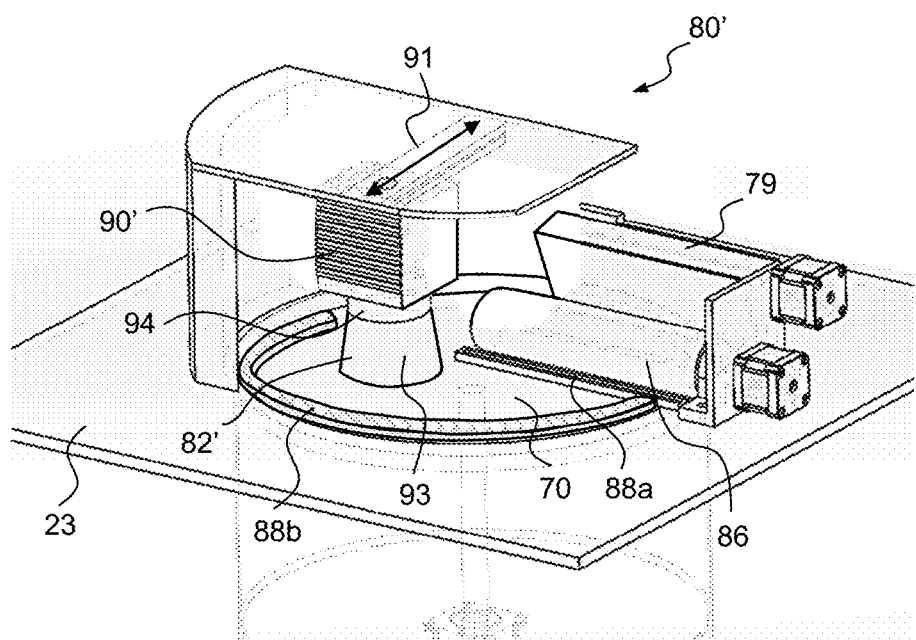
FIG. 13 is a top perspective view of an alternative build assembly.

Referring to FIG. 13, a system incorporating an alternative build assembly 80' is illustrated. The build assembly 80' is similar to that described above and only the differences will be described herein. It is noted that any of the features described in the present embodiment may be separately incorporated into the previous embodiment and vice versa. In the present embodiment, the build assembly 80' includes a pair of heating elements 88a and 88b. Since in some applications it may be beneficial to heat the powder before fusing, the heating element 88a may be a heating bar positioned downstream from the roller 86 to heat the smoothed powder. Additionally, or alternatively, the heating element 88b may be a circular bar extending about a portion or the entirety of the build platform 70 to heat the powder over a larger area. The heating elements 88a, 88b may have various configurations, for example, an electronic heating bar, infrared heating bar, induction heating bar or the like. In an alternative embodiment, a portion of the lasers 90a and 90b may be utilized to preheat the material and the remaining lasers 90c and 90d may be utilized to fuse the powder.

Additionally, the build assembly 80' includes a single laser 90' which is self-contained. The laser 90' is moveable along a rail 91 supported by a portion of the support frame. In the illustrated embodiment, the rail 91 has a linear configuration and the laser 90' moves radially inward and outward as indicated by the arrow in FIG. 13. The rail may have other configurations, for example, an arcuate path or a structure that allows the laser 90' to be moved in multiple coordinate planes. The moveable laser 90' is not limited to a rail system, but may be otherwise moved, for example, utilizing a robotic arm (not shown). Additionally, the laser 90' includes an extended cone 93, for example, manufactured from glass, which extends from the laser beam window 94 to just above the build platform 70. The extended cone 93 defines a laser specific gas chamber 82' which would contain the inert gas necessary for the laser sintering or melting. The extended cone 93 would eliminate the need for a sealed build chamber.

Figure 14:
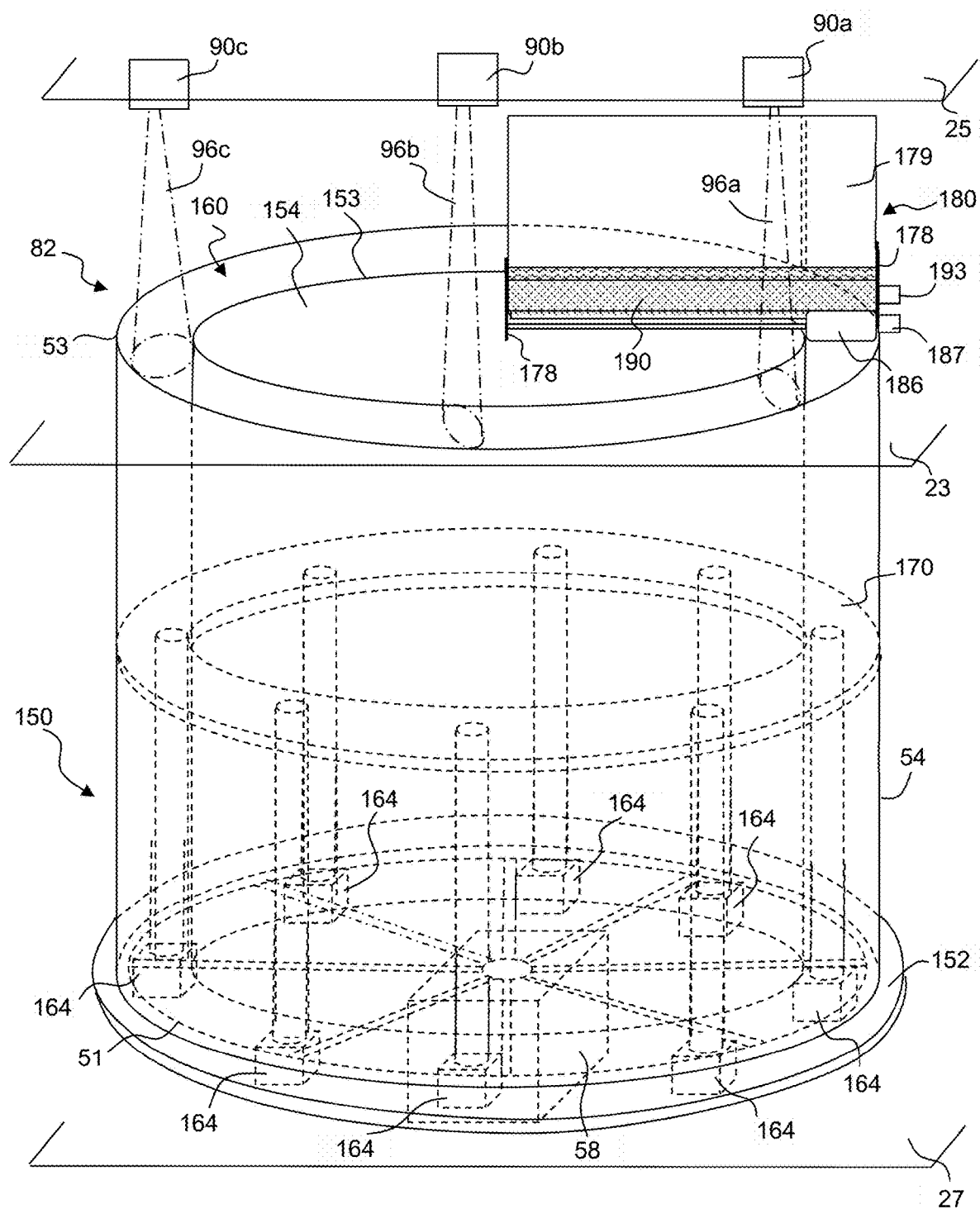
FIG. 14 is a perspective view of an alternative 3D printing system incorporating an alternative drum assembly and an alternative build assembly.

Referring to FIGS. 14-21, a system incorporating an alternative drum assembly 150 and an alternative build assembly 180 will be described. In FIG. 14, the drum assembly 150 and the build assembly 180 are illustrated relative to the support platforms 21, 23, 25 the drum assembly 50 and the build assembly 80 will be described in more detail. As in the previous embodiments, the lower support panel 21 is configured to support the drum assembly 150. The upper support panel 25 is configured to support portions of the build assembly 80. The intermediate panel 23 is positioned between the lower and upper panels 21, 25 with a build chamber 82 defined therebetween the intermediate panel 23 and the upper support panel 25. Except as described hereinafter, the system of FIGS. 14-21 operates in a manner similar to that described with the above embodiments.

Figure 15:
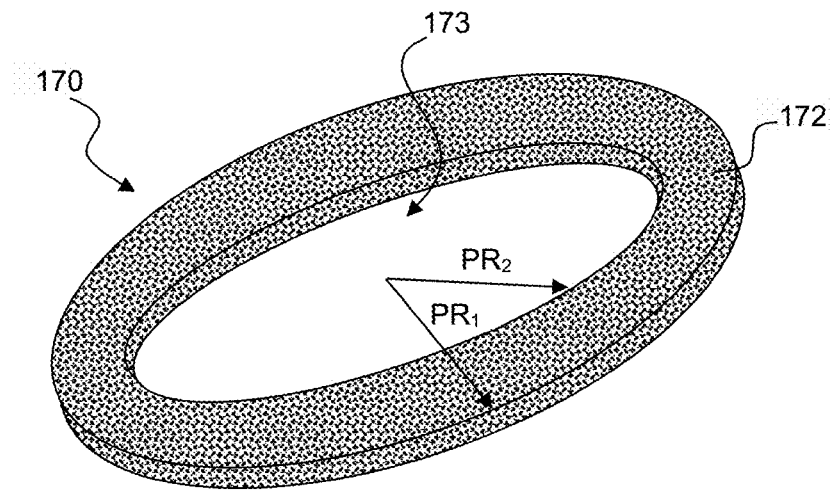
FIG. 15 is perspective view of the build platform of the drum assembly of FIG. 14.
Figure 16:
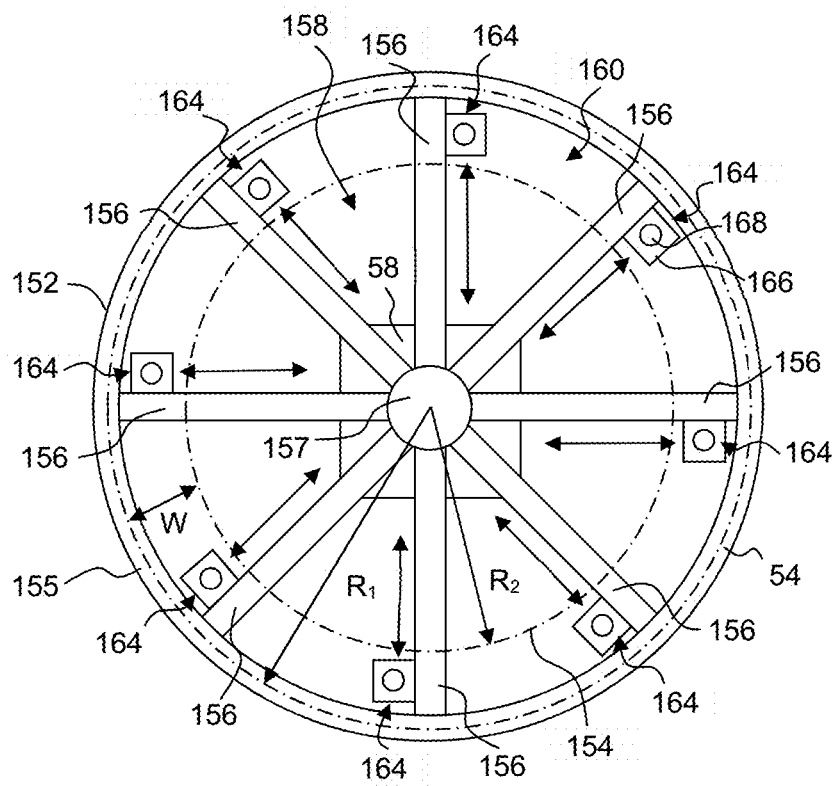
FIG. 16 is a plan view of the drum assembly of FIG. 14.
Figure 17:
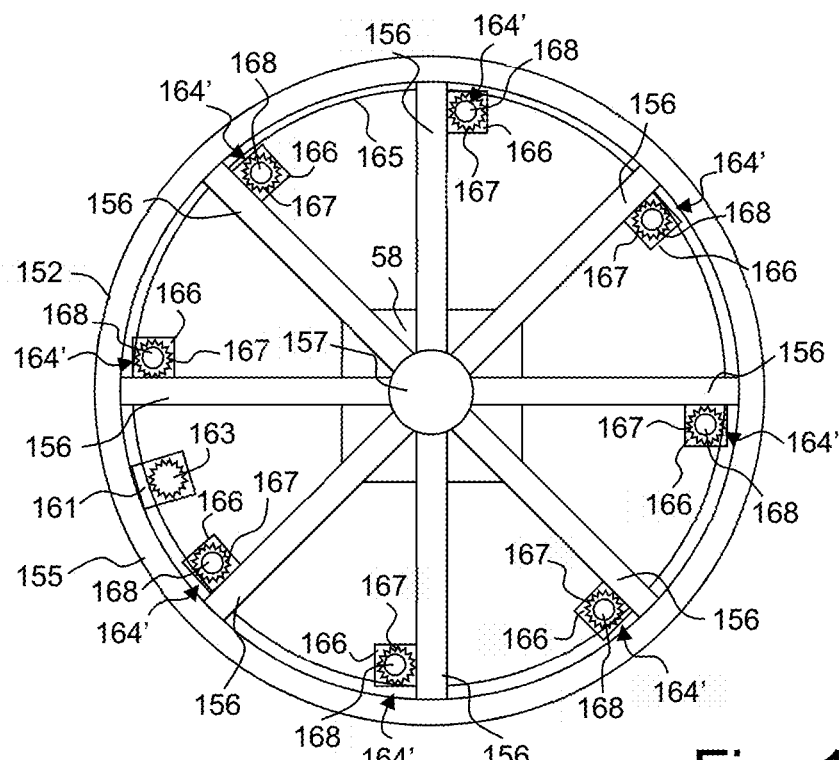
FIG. 17 is a plan view similar to FIG. 16 showing an alternative platform drive assembly.

Referring to FIGS. 14-16, the drum assembly 150 generally includes a generally cylindrical outer drum 54 and a generally cylindrical inner drum 154. Each drum 54, 154 extends from a lower end 51, 151 to an upper end 53, 153. The lower end 51 of drum 54 is supported on a rotatable platform 152 in sealing engagement therewith. The lower end 151 of the inner drum 151 is also supported on the rotatable platform 152. Clamps or the like (not shown) are utilized to releasably secure the drums 54, 154 to the platform 152. The upper ends 53, 153 of the drums 54, 154 extend to the build chamber 82 through an opening in the intermediate panel 23. The upper end 53 of the outer drum 54 is in sealing engagement with the intermediate panel 23 while still being rotatable relative thereto.

A powder receiving chamber 160 is defined between the inner surface of the outer drum 54 and the outer surface of the inner drum 154. As shown in FIG. 16, the outer drum 54 has an inner radius of $R_1$ and the inner drum 154 has an outer radius $R_2$. The difference between $R_1$ and $R_2$ defines the width W of the powder receiving chamber 160. As shown in FIG. 15, the build platform 170 of the present embodiment has a disc shaped body 172 with a central passage 173. The build platform body 172 has an outer radius $PR_1$ which is slightly smaller than the outer drum inner radius $R_1$ and an inner radius $PR_2$ which is slightly larger than the inner drum outer radius $R_2$. With such a configuration, the build platform 170 supports the powder within the powder receiving chamber 160 but is axially moveable up and down within the chamber 160.

The radii $R_1$ and $R_2$ may be chosen to be any desired size with any desired width W to print the intended product. The build platform 170 will correspondingly be chosen with radii $PR_1$ and $PR_2$. For example, to print the illustrative double-wall tube 200 shown in FIG. 21, the width W may be selected to be slightly larger than the thickness T of the double-wall tube 200. If, for example, the tube 200 has a thickness T of 1 inch, the width W of the powder receiving chamber 160 could be selected to be 2 inches. In one exemplary embodiment, the radius $R_2$ is at least 25% the radius $R_1$. In another exemplary embodiment, the radius $R_2$ is at least 50% the radius $R_1$. In yet another exemplary embodiment, the radius $R_2$ is at least 75% the radius $R_1$. In a further exemplary embodiment, the radius $R_2$ is at least 90% the radius $R_1$. In each such embodiment, the volume of powder necessary to build the desired product is reduced compared to an assembly without an inner drum. Without the inner drum, the volume of required powder $V_R$ would be equal to the volume of the outer drum, namely, $V_R = \pi R_1^2 h$. However, by defining the powder receiving chamber 160 between the outer drum 54 and the inner drum 154, the volume of required powder $V_R$ will equal the volume of the outer drum Vo minus the volume of the inner drum $V_I$, namely, $V_R = (\pi R_1^2 h) - (\pi R_2^2 h)$.

As a first example, if the double-wall tube has an outer diameter of 2 feet and a height of 2 feet, the outer drum 54 may have an $R_1$ of 12.25 inches (i.e. a diameter which is a half inch larger than outer diameter of the tube) and the inner drum 154 may have an $R_2$ of 11.25 inches (i.e. a diameter which is a half inch less than inner diameter of the tube). Without the inner drum, the volume of required powder $V_R$ would equal $V_R = \pi R_1^2 h = \pi (12.25 \text{ in})^2 (24 \text{ in}) = 11{,}314.45 \text{ in}^3$. With the inner drum of the present disclosure, the $V_R$ is reduced to $V_R = (\pi R_1^2 h) - (\pi R_2^2 h) = (\pi (12.25 \text{ in})^2 (24 \text{ in})) - (\pi (11.25 \text{ in})^2 (24 \text{ in})) = 11{,}314.45 \text{ in}^3 - 9542.59 \text{ in}^3 = 1771.86 \text{ in}^3$. The same tube 200 may be manufactured utilizing only 1771.86 in³ of material instead of 11,314.45 in³, or 15.66% volume of material. For larger scale objects, the material requirement may be even further reduced. For example, for a tube having a 12 foot diameter, a height of 5 feet and a thickness of 4 inches, the material requirement would be only 8.13% volume of material. More specifically, without the inner drum, the volume of required powder $V_R$ would equal $V_R = \pi R_1^2 h = \pi (72.25 \text{ in})^2 (60 \text{ in}) = 983{,}958.6 \text{ in}^3$. With the inner drum of the present disclosure, the $V_R$ becomes $V_R = (\pi R_1^2 h) - (\pi R_2^2 h) = (\pi (72.25 \text{ in})^2 (60 \text{ in})) - (\pi (69.25 \text{ in})^2 (60 \text{ in})) = 983{,}958.6 \text{ in}^3 - 903{,}942.24 \text{ in}^3 = 80{,}016.36 \text{ in}^3$. The same tube 200 may be manufactured utilizing only 80,016.36 in³ of material instead of 983,958.6 in³. Such a significant savings in material has many benefits, for example, reduced inventory, reduced waste and significantly less power required to rotate the drums 54, 154.

Referring to FIG. 16, the rotatable platform 152 of the present embodiment includes an outer rim 155 and a center support 157 with a plurality of rails 156 extending therebetween. In the illustrated embodiment, the outer drum 54 is supported by the outer rim 155 and the inner drum 154 is supported by the rails 156. It is contemplated that both the outer and inner drums 54, 154 may be supported by the rails 156. Each of the drums 54, 154 will be connected to their respective support surface such that the drums 54, 154 rotate with the rotatable platform 152.

In the embodiment illustrated in FIG. 16, a space 158 is defined between each pair of adjacent rails 156. The spaces 158 allow linear actuators 164 to extend through the rotatable platform 152 and between the drums 54, 154 and into contact with the build platform 170. In the illustrated embodiment, each of the linear actuators 164 includes a housing 166 mounted to a respective rail 156 and a rod 168 extendible relative to the housing 166. The illustrated housings 166 are radially adjustable such that the position of the linear actuators 164 may be radially adjusted to properly align with the build platform 170.

The linear actuators 164 may have various configurations, for example, screw drives, pneumatic cylinders, hydraulic cylinders, or any other desired configuration. Additionally, to facilitate manufacture of objects having a large height without significantly increasing the height of the system, the linear actuators of each of the embodiments described herein may have a telescoping or scissor configuration which allows a larger extension than the envelope of the actuator, for example, the T2—Telescoping Linear Actuator by Helix Linear Technologies or the I-Lock Spiralift 250 by Paco Spiralift. Such telescoping or scissor lifts may be electronically, pneumatically, hydraulically or otherwise controlled. As another alternative, the linear actuators may be positioned along the surface of one of the drums 54, 154 with pins extending through vertical slots in the respective drum into the chamber to support the build platform. An illustrative embodiment with such a configuration will be described hereinafter with reference to FIGS. 27-29.

Figure 18:
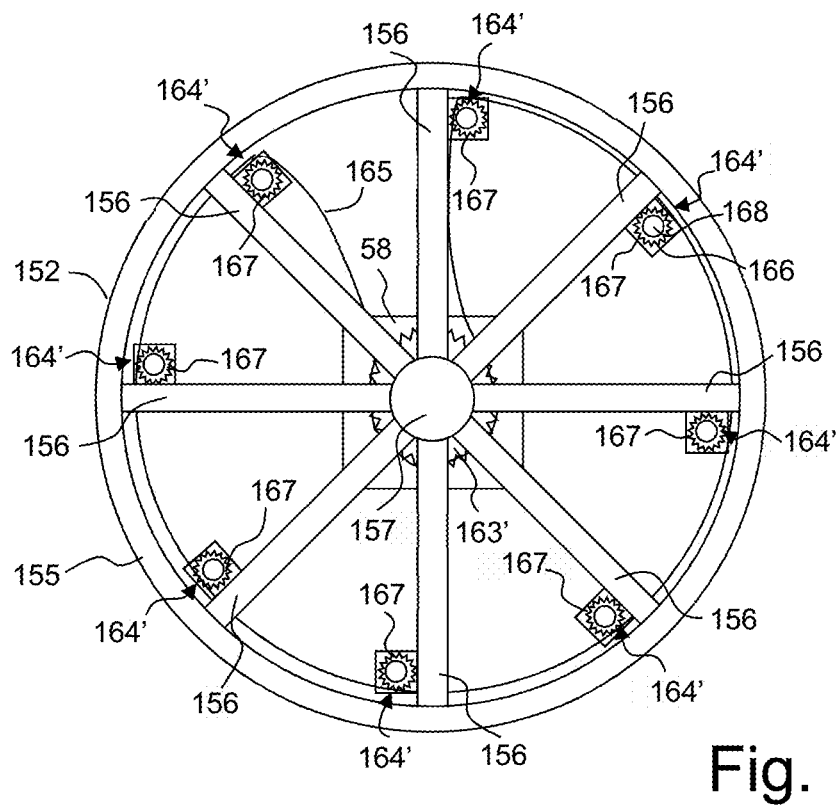
FIG. 18 is a plan view similar to FIG. 16 showing another alternative platform drive assembly.

The linear actuators 164 are configured for synchronized movement such that the build platform 170 is supported and raised or lowered in a controlled manner. In the embodiment illustrated in FIG. 16, each housing 166 houses a screw motor (not shown). The system control processor controls each of the screw motors such that the actuators 164 provide synchronized movement of the build platform 170. Turning to the embodiment illustrated in FIG. 17, each of the linear actuators 164' includes a drive gear 167 supported by the housing 166 and engaging the rod 168. Rotation of the drive gear 167 causes linear motion of the rod 168. In the illustrated embodiment, a platform drive motor 161 controllably drives a main gear 163. A belt 165 or the like engages the main gear 163 and each of the drive gears 167 such that rotation of the platform drive motor 161 causes synchronized rotation of the drive gears 167. The embodiment illustrated in FIG. 18 is similar to the previous embodiment, however, instead of a separate drive motor, the main gear 163' is connected to the drum motor 58 supported below the rotatable platform 152. A belt 165 or the like engages the main gear 163' and each of the drive gears 167 such that rotation of the drum motor 58 causes synchronized rotation of the drive gears 167. Other synchronized drive assemblies may alternatively be utilized. The linear actuators 164 may be configured to raise or lower the build platform 170 in any desired manner. In one embodiment, the actuators 164 are configured such that the build platform 170 moves equally at all times such that the platform moves in an incremental, vertical manner even though the platform 170 is rotating. In another embodiment, the actuators 164 are configured to move differently from another such that the platform 170 moves in a spiral manner as it rotates and moves vertically.

Figure 19:
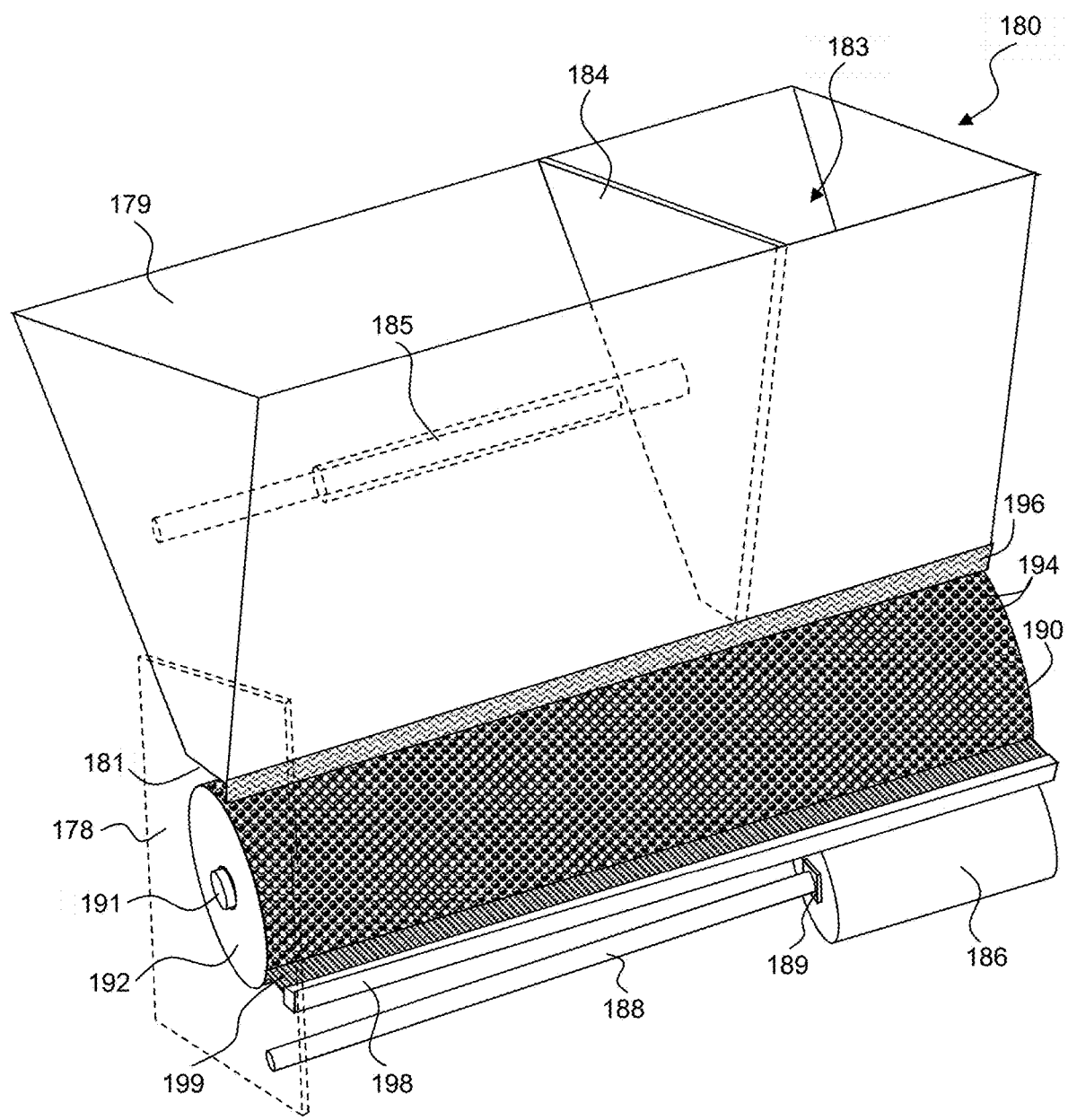
FIG. 19 is a perspective view of the build assembly of FIG. 14.
Figure 20:
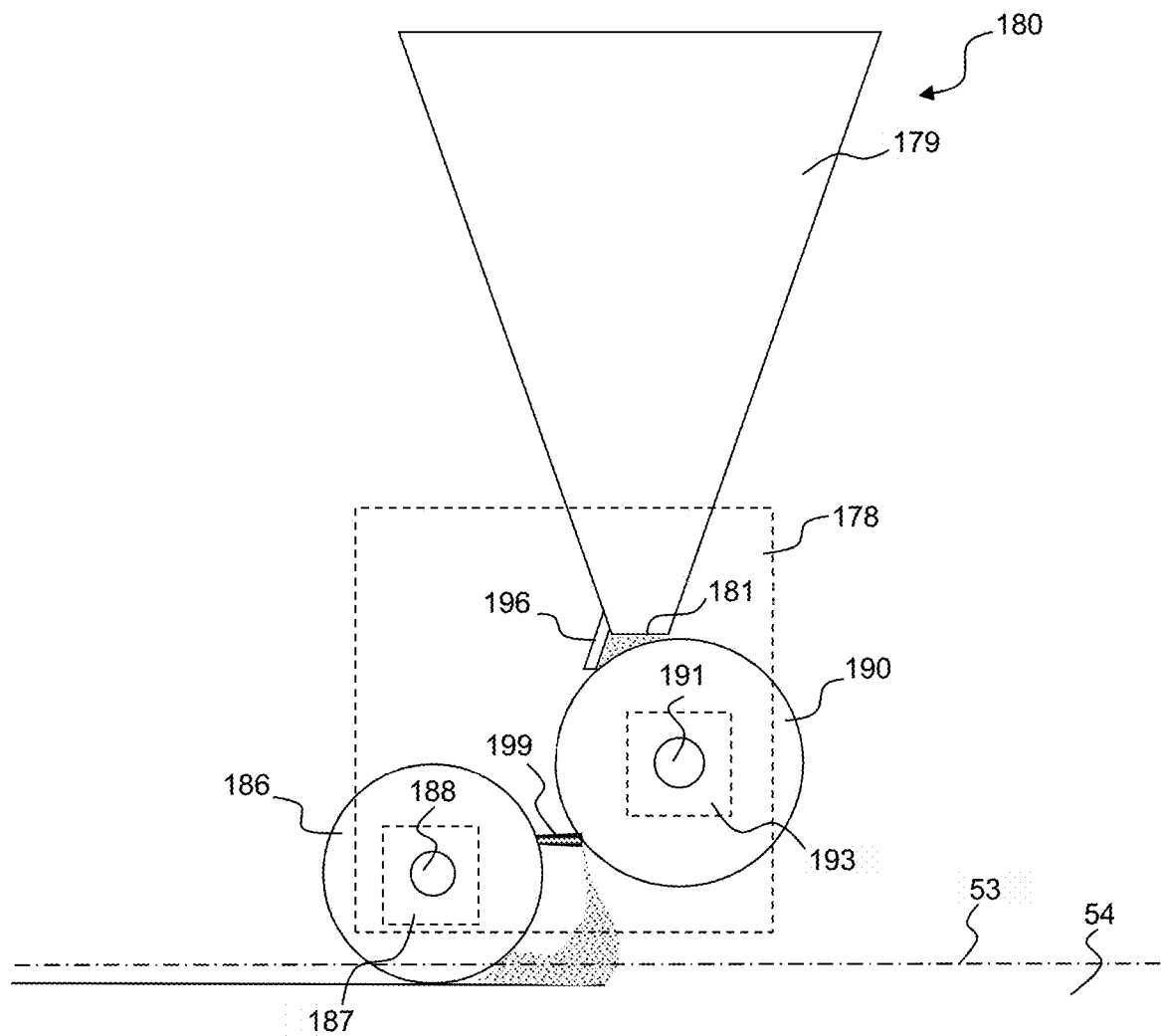
FIG. 20 is a side elevation view of the build assembly of FIG. 14.

Referring to FIGS. 14, 19 and 20, an exemplary build assembly 180. While the build assembly 180 is described in conjunction with the present embodiment, it is understood that features of the build assembly 180 may be utilized with any of the embodiments described herein. The build assembly 180 includes a hopper 179. As shown in FIG. 14, the hopper 179 may have a width such that it extends from the outer drum to the center axis thereof. Since the width W of the powder receiving chamber 160 is less than the width of the hopper 179, the hopper 179 includes an adjustable wall 184 such that the width of the powder area 183 may be adjusted to approximately equal the width W of the powder receiving chamber 160. In the illustrated embodiment, a telescoping rod 185 sets the position of the adjustable wall 184, however, other mechanisms, for example, clips or the like may be utilized to fix the position of the adjustable wall 184.

With reference to FIGS. 19 and 20, the hopper 179 has a lower opening 181 such that powder within the powder area 183 is delivered to the distribution roller 190. The distribution roller 190 has a cylindrical body 192 rotatably supported on a shaft 191. The shaft 191 may be supported by brackets 178 extending from the hopper 179 or otherwise supported below the hopper 179. The cylindrical body 192 a plurality of small cavities 194 defined in the surface thereof. As one non-limiting example, the cavities 194 have a diameter of 2 mm and a depth of 2 mm. Rotation of the distribution roller 190 is controlled by an actuator 193. As the distribution roller 190 is rotated, powder is pushed into the cavities 194 by an elastic blade 196 positioned adjacent the hopper opening 181 and contacting the distribution roller 190. As the roller 190 rotates, the cavities 194 carry the powder toward the build platform 170. A brush 198 with a plurality of bristles 199 is positioned adjacent the distribution roller 190 such that the bristles 199 engage the cavities 194 and cause the powder to be distributed onto the build platform 170. Since the powder is carried by the cavities 194, the rate of rotation of the distribution roller 190 will control the amount of powder delivered toward the build platform, i.e. the faster the distribution roller 190 is rotated, the more powder will be delivered.

After the powder is delivered to the rotating build platform 170, it is smoothed by a roller 186 on the trailing side of the distribution roller 190. The roller 186 is rotatably supported on a shaft 188 extending between the brackets 178 extending from the hopper 179. The roller 186 will have a length approximately equal to or slightly less than the width W of the powder receiving chamber 160 such that a portion of the roller 186 is received within the chamber 160. Since the length of the roller 186 is generally going to be less than the length of the shaft 188, a clip 189 or the like may be positioned along the shaft 188 to fix the position of the roller 186. If the drums 54, 154 are changed to define a different chamber width W, the roller 186 can be similarly changed to correspond to the new width W. The roller 186 is rotated by an actuator 187 such that its lower edge moves toward the hopper 179, i.e. toward the oncoming powder, thereby smoothing the powder. The smoothed powder is then ready for selective fusing via melting or sintering utilizing a targeted energy source.

Figure 21:
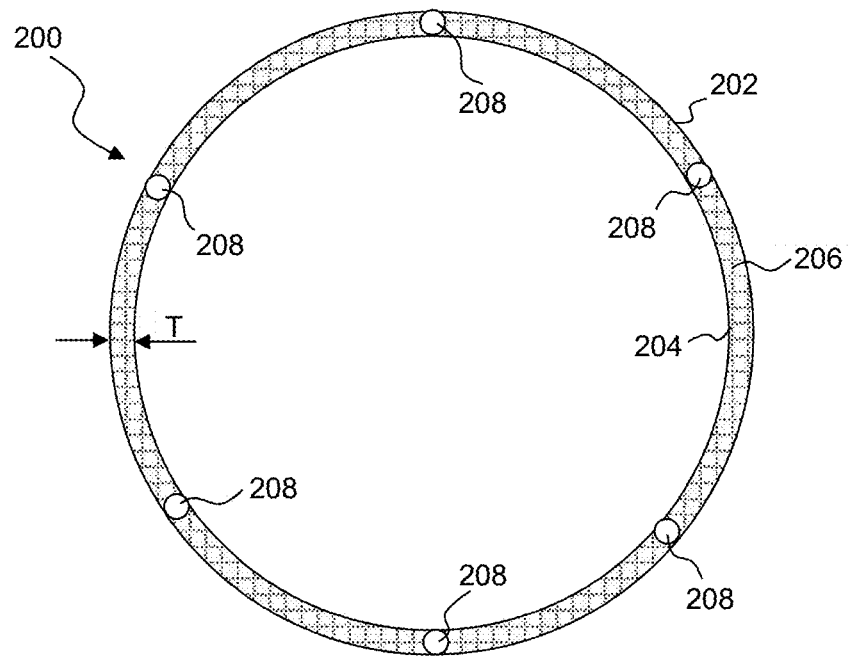
FIG. 21 is a top plan view of an example double-walled tube manufactured utilizing the printing system of FIG. 14.

Referring to FIGS. 14 and 21, as in the previous embodiments, the targeted energy source may be a plurality of lasers 90a-90c, however, other sources, for example, electron beam guns, may be utilized. While three lasers 90a-90c are illustrated, it is understood that any number of lasers, including more or fewer than three, may be utilized. Each laser 90a-90c has an associated beam deflection system, e.g. Galvano scanner, which is used to focus the laser beam 96a-96c onto a desired position on the build platform 170 in order to scan each layer. In one embodiment, each laser 90a-90c may be utilized to complete a distinct portion of the desired product. For example, with the example double-walled tube 200 of FIG. 21, one of the lasers 90a may focus on the thicker outer wall 202 while one of the lasers 90b focuses on the thicker inner wall 204 and the other laser 90c focuses on the thinner honeycomb interior 206 and interior conduits 208. Such a focused system allows for rapid rotational production of the desired product. It is also contemplated, as in the previous embodiments, that the multiple lasers may print consecutive portions of the desired product, thereby stitching the product together as it travels along the complete rotational path. It is noted that while the example tube has a cylindrical configuration, the disclosure is not limited to such and other shapes may be manufactured with a desired chamber width W chosen to accommodate such structure.

Figure 22:
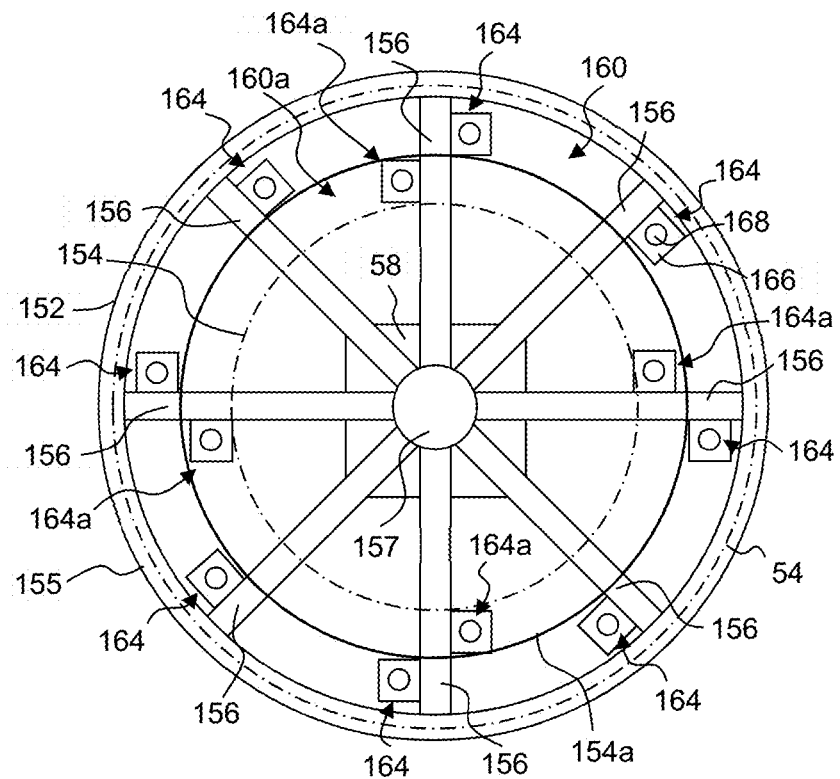
FIG. 22 is a plan view of another embodiment of the drum assembly.
Figure 23:
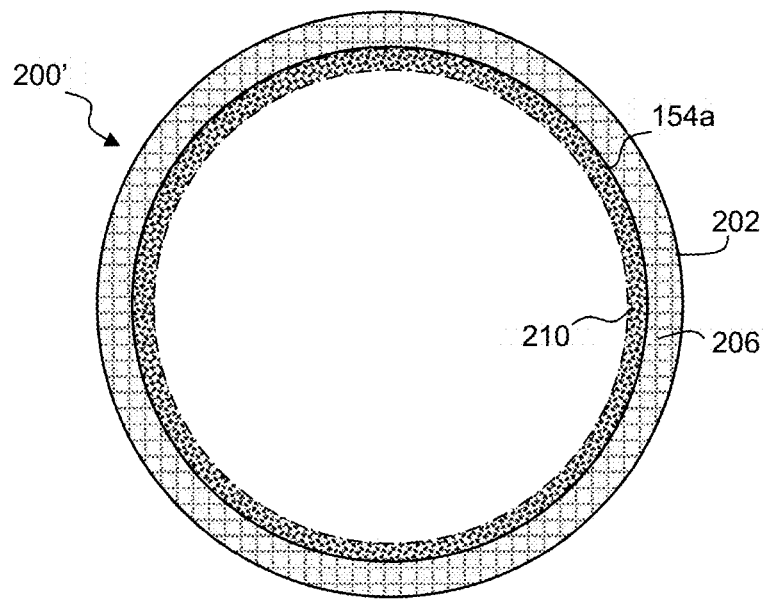
FIG. 23 is a top plan view of an example double-walled tube manufactured utilizing the drum assembly of FIG. 22.

Additionally, the disclosure is not limited to a single powder receiving chamber. Referring to FIGS. 22 and 23, an embodiment utilizing two powder receiving chambers 160, 160a will be described, however, the number of chambers may be increased above the illustrated two by utilizing more drums. In the present embodiment, an intermediate drum 154a is positioned between the outer drum 54 and the inner drum 154 to define an outer chamber 160 and an inner chamber 160a. The powder deposited into each chamber 160, 160a may be the same or different. Additionally, the products in each chamber may be independent of one another, or as illustrated in FIG. 23, may form an integrated product with the intermediate drum 154a forming a part of the product. The double-wall drum 200' illustrated in FIG. 23 includes an outer wall 202 and an inner wall defined by the intermediate drum 154a. A honeycomb structure 206 extends between the outer wall 202 and the inner wall 154a. The honeycomb structure 206 and the outer wall 202 are formed in the outer chamber 160. The tube 200' also includes a ceramic insulation layer 210 formed on the inside of the inner wall 154a. The ceramic insulation layer 210 is formed in the inner chamber 160a. Other integrated products of different or similar materials may also be manufactured utilized multiple chambers 160, 160a.

Figure 24:
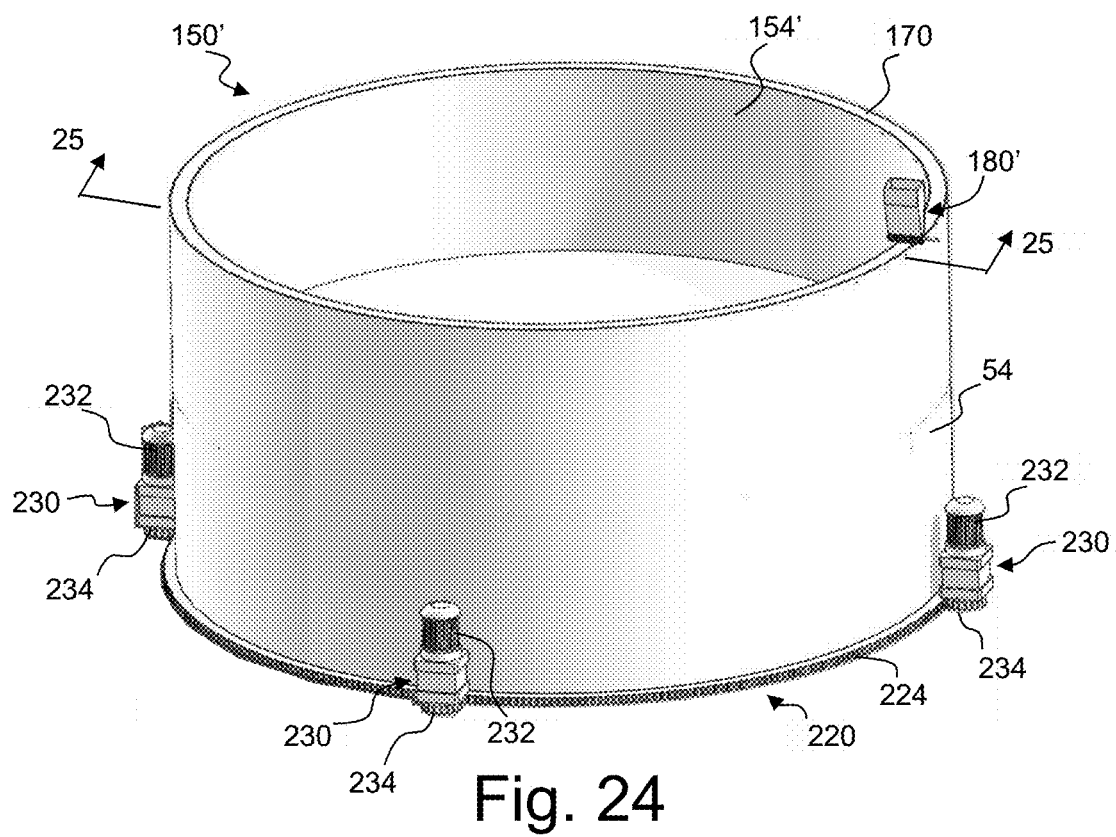
FIG. 24 is a perspective view of another alternative drum assembly.
Figure 25:
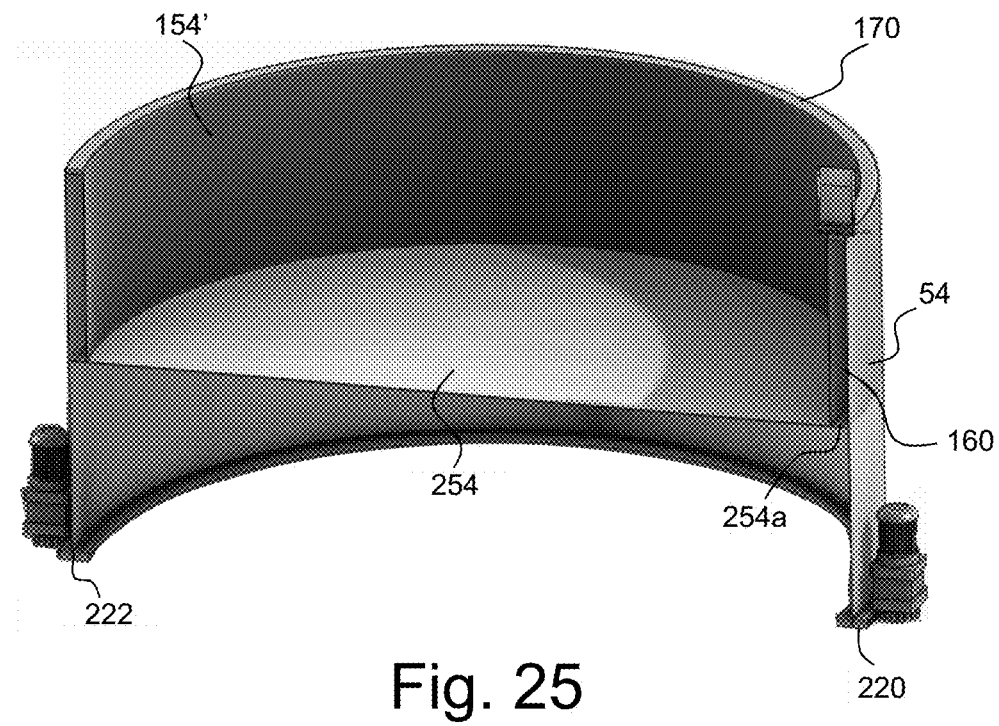
FIG. 25 is a cross-sectional view along the line 25-25 of FIG. 24.
Figure 26:
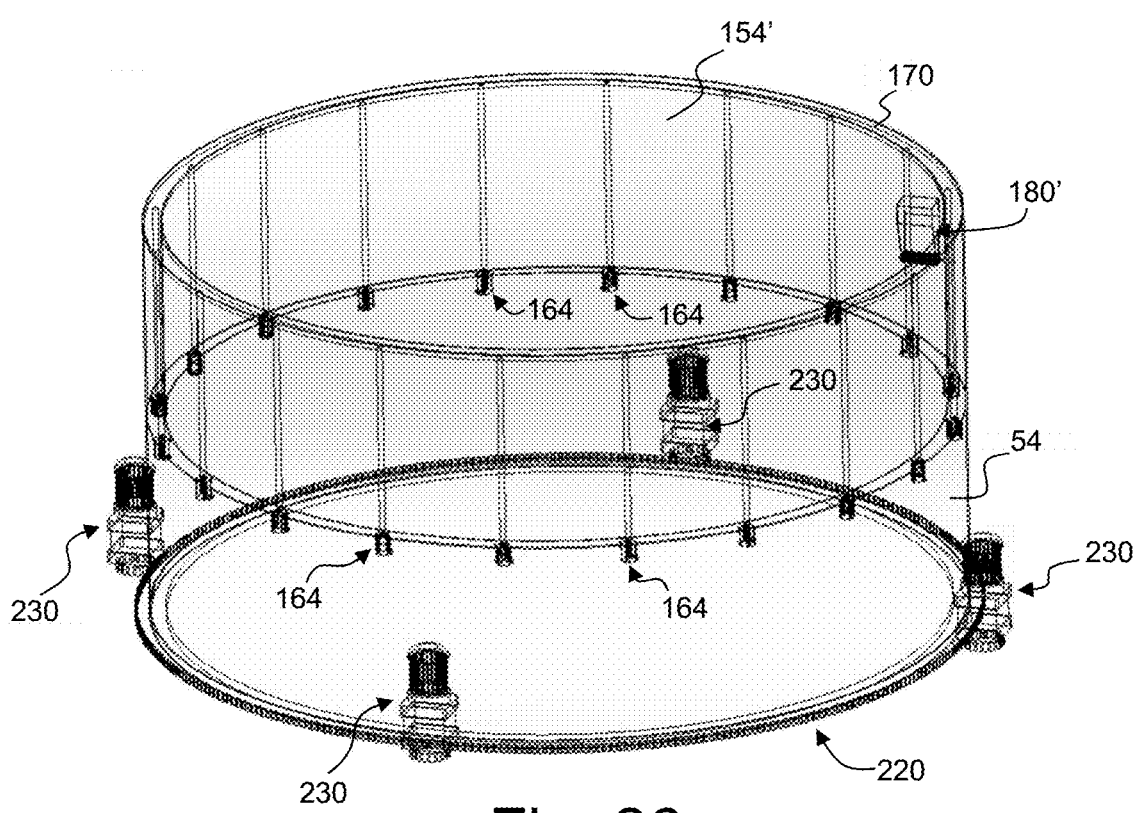
FIG. 26 is a perspective view similar to FIG. 24 showing the drums transparently.

Referring to FIGS. 24-26, a drum assembly 150' in accordance with another embodiment of the disclosure will be described. The drum assembly 150' is similar to the drum assembly 150 and only the differences will be described herein. The drum assembly 150' includes an outer drum 54 and an inner drum 154'. As in the previous embodiment, the drums 54 and 154' define a powder receiving chamber 160 in which the build platform 170 is positioned. The build assembly 180' of the present embodiment is substantially the same as the previous embodiment but does not extend to the center axis of the drums.

Referring to FIG. 25, in the present embodiment, the inner drum 154' is shorter than the outer drum 54 and includes a bottom surface 254 which extends across the inner drum 154' and across the chamber 160 as shown at 254a. The bottom surface 254 may be secured to the outer drum 54 to fix the inner drum 154' relative to the outer drum 54 such that they rotate together.

For rotation, the outer drum 54 is fixed in a groove 222 of track 220. The track 220 has a plurality of outwardly extending gear teeth 224. A plurality of drum motors 230 are positioned about the track 220 which may increase efficiency and reliability of the rotational motion. Each drum motor 230 includes a motor 232 configured to rotate a drive gear 234. As the motors 232 rotate the drive gears 234, the drive gears 234 engage the gear teeth 224 such that the track 220 and outer drum 54 are rotated.

As in the previous embodiment, a plurality of linear actuators 164 are positioned below the platform 170 to controllably raise and lower the platform 170. In the present embodiment, the linear actuators 164 are positioned within the chamber 160 and are supported by the bottom surface 254 of the inner drum 154'. In all other aspects, the linear actuators 164 are as described above.

Figure 27:
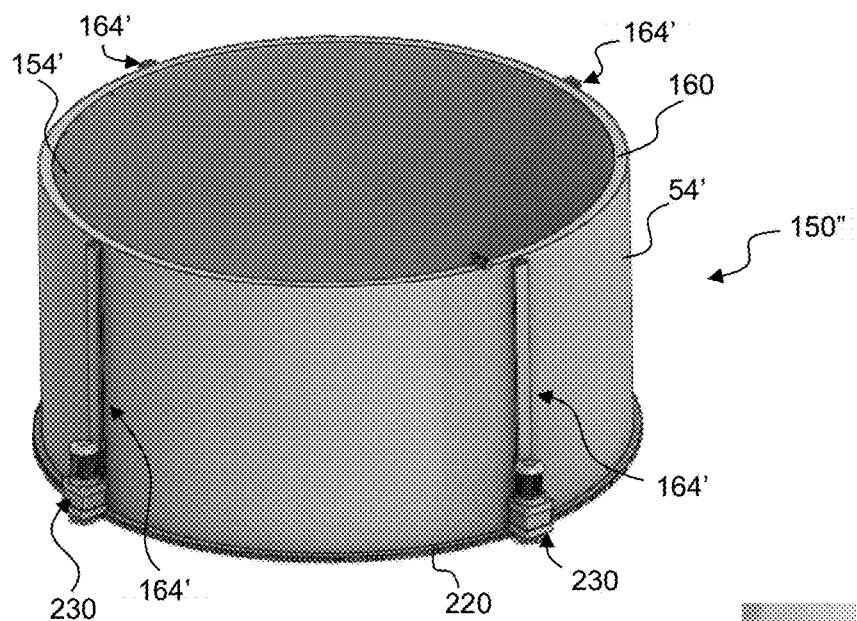
FIG. 27 is a top perspective view of another alternative drum assembly.
Figure 28:
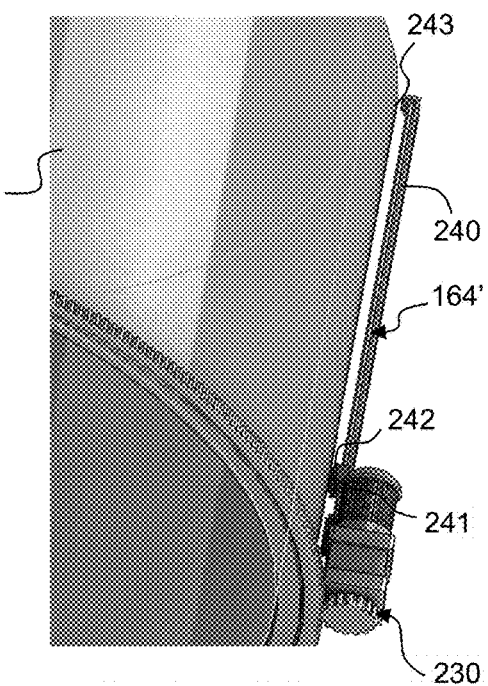
FIG. 28 is a bottom perspective view of the drum assembly of FIG. 27.
Figure 29:
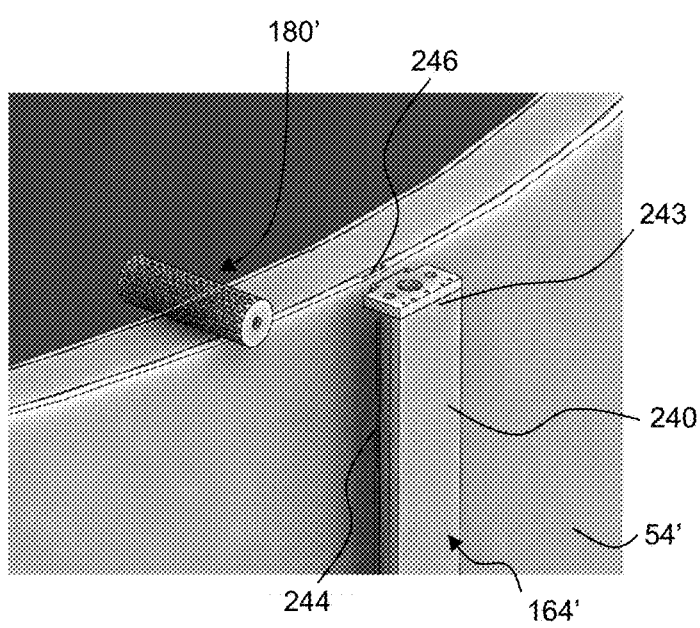
FIG. 29 is an expanded view of a portion of the drum assembly of FIG. 27.

Referring to FIGS. 27-29, a drum assembly 150" in accordance with another embodiment of the disclosure will be described. The drum assembly 150" is similar to the drum assembly 150' and only the differences will be described herein. The drum assembly 150" includes an outer drum 54' and an inner drum 154'. As in the previous embodiment, the drums 54' and 154' define a powder receiving chamber 160 in which the build platform is positioned. The build assembly 180' of the present embodiment is substantially the same as the previous embodiment.

In the present embodiment, the linear actuators 164' are defined along the exterior surface of the drum 54'. It is understood that the actuators 164' could be defined along the interior surface of the drum 154' or along both surfaces. Each linear actuator 164' includes a rail 240 extending between ends 241, 243 which are secured relative to the outer drum 54'. Each rail 240 is aligned with a vertical slot 244 through the outer drum 54'. A pin member 242 is configured to ride along each rail 240. The pin member 242 includes a pin (not shown) which extends through the vertical slot 244 and into the powder receiving chamber 160 below the build platform such that the build platform is supported on the pins of each linear actuator 164'. The pin members 242 are controllably moved along the rails 240 to raise and lower the build platform. Each of the linear actuators 164' are synchronized to move the pin members 242, and thereby the build platform, at a desired rate.

Each pin may extend through a flexible gasket 246 or the like along the vertical slot 244 such that the gasket 246 prevents powder from exiting through the vertical slot 244. The gasket 246 has a slot which allows the pin to pass through but is otherwise closed. As the pin moves downward, the gasket 246 seals as the build platform moves along the gasket 246. Other mechanisms may alternatively be utilized to seal the slot 244. For example, in one embodiment, a coiled flat strip is positioned at the top of each slot 244 with a free end connected to the respective pin. As the pin moves downward, the strip is pulled along the slot 244, thereby sealing the slot 244 as the pin moves downward.

These and other advantages of the present disclosure will be apparent to those skilled in the art from the foregoing specification. Accordingly, it will be recognized by those skilled in the art that changes or modifications may be made to the above-described embodiments without departing from the broad inventive concepts of the disclosure. It should therefore be understood that this disclosure is not limited to the particular embodiments described herein, but is intended to include all changes and modifications that are within the scope and spirit of the disclosure as defined in the claims.

What is claimed is:

1. An apparatus for fabricating a three-dimensional object from a representation of the object stored in memory, the apparatus comprising:
   an outer drum supported for rotation with a powder receiving chamber defined within the outer drum, the outer drum having a given height from a first end to a second end thereof;
   a build platform supported by a linear actuator assembly for linear movement within the powder receiving chamber from a first position adjacent the first end of the outer drum to a second position within the powder receiving chamber, the linear actuator assembly is configured such that the second position is spaced from the first end of the outer drum by more than half the given height;
   a powder feed hopper positioned above the build platform; and
   at least one directed energy source positioned above the build platform, the at least one directed energy source is configured to apply directed energy to at least a portion of the powder receiving chamber, wherein the linear actuator assembly includes a plurality of spaced apart linear drives and the outer drum includes a plurality of vertical slots extending from adjacent the first end to adjacent the second end and each of the linear drives is positioned along an outside surface of the outer drum aligned with a respective vertical slot, each of the linear drives including a pin member extending through the respective vertical slot and engaging and supporting the build platform.

2. An apparatus for fabricating a three-dimensional object from a representation of the object stored in memory, the apparatus comprising:

an outer drum supported for rotation with a powder receiving chamber defined within the outer drum, the outer drum having a given height from a first end to a second end thereof;

a build platform supported by a linear actuator assembly for linear movement within the powder receiving chamber from a first position adjacent the first end of the outer drum to a second position within the powder receiving chamber, the linear actuator assembly is configured such that the second position is spaced from the first end of the outer drum by more than half the given height;

a powder feed hopper positioned above the build platform; and at least one directed energy source positioned above the build platform, the at least one directed energy source is configured to apply directed energy to at least a portion of the powder receiving chamber, wherein the linear actuator assembly includes a plurality of spaced apart linear drives and each of the linear drives has a scissor configuration.

3. The apparatus according to claim 1 wherein a flexible gasket seals each vertical slot except for passage of the respective pin member.

4. The apparatus according to claim 1 wherein a coiled flat strip is positioned at the top of each vertical slot with a free end connected to the respective pin.

5. The apparatus according to claim 1 wherein linear motion of the linear drives is synchronized.

6. An apparatus for fabricating a three-dimensional object from a representation of the object stored in memory, the apparatus comprising:

an outer drum supported for rotation with a powder receiving chamber defined within the outer drum, the outer drum having a given height from a first end to a second end thereof;

a build platform supported by a linear actuator assembly for linear movement within the powder receiving chamber from a first position adjacent the first end of the outer drum to a second position within the powder receiving chamber, the linear actuator assembly is configured such that the second position is spaced from the first end of the outer drum by more than half the given height;

a powder feed hopper positioned above the build platform; and at least one directed energy source positioned above the build platform, the at least one directed energy source is configured to apply directed energy to at least a portion of the powder receiving chamber, wherein the linear actuator assembly includes a plurality of spaced apart linear drives and the position of each of the linear drives is radially adjustable.

7. The apparatus according to claim 1 including a plurality of directed energy sources with each of the directed energy sources at a fixed location and configured to apply directed energy to a different portion of the powder receiving chamber.

8. The apparatus according to claim 1 wherein an inner drum is positioned within the outer drum and supported for rotation therewith such that the powder receiving chamber is defined between the outer drum and the inner drum.

9. The apparatus according to claim 8 wherein the outer drum has an inner radius $R_1$ and the inner drum has an outer radius $R_2$ and the build platform has a width slightly less than $R_1-R_2$.

10. The apparatus according to claim 9 wherein $R_2$ is at least 25% of $R_1$.

11. The apparatus according to claim 9 wherein $R_2$ is at least 50% of $R_1$.

12. The apparatus according to claim 9 wherein $R_2$ is at least 75% of $R_1$.

13. The apparatus according to claim 9 wherein $R_2$ is at least 90% of $R_1$.

14. The apparatus according to claim 8 wherein an intermediate drum is positioned between the outer drum and the inner drum such that the powder receiving chamber is defined between the outer drum and the intermediate drum and a second powder receiving chamber is defined between the intermediate drum and the inner drum.

15. The apparatus according to claim 14 wherein a first powder is delivered to the powder receiving chamber and a second powder is delivered to the second powder receiving chamber and the first and second powders are different from one another.

16. The apparatus according to claim 1 wherein a distribution roller is positioned between the powder feed hopper and the powder receiving chamber.

17. The apparatus according to claim 16 wherein the distribution roller includes a body with a surface defining a plurality of cavities which are configured to receive powder therein.

18. The apparatus according to claim 17 wherein the distribution roller is controllably rotated and the speed of rotation dictates the amount of powder delivered to the powder receiving chamber.

* * * * *